(12) United States Patent
Lamb et al.

(10) Patent No.: US 9,395,543 B2
(45) Date of Patent: Jul. 19, 2016

(54) WEARABLE BEHAVIOR-BASED VISION SYSTEM

(71) Applicant: Microsoft Technology Licensing, LLC, Redmond, WA (US)

(72) Inventors: Mathew J. Lamb, Mercer Island, WA (US); Alex Aben-Athar Kipman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 63 days.

(21) Appl. No.: 13/740,165

(22) Filed: Jan. 12, 2013

(65) Prior Publication Data

US 2014/0198017 A1 Jul. 17, 2014

(51) Int. Cl.
| | | |
|---|---|---|
| *G02B 27/01* | (2006.01) | |
| *G06F 3/01* | (2006.01) | |
| *G02B 27/00* | (2006.01) | |
| *G01C 21/20* | (2006.01) | |

(52) U.S. Cl.
CPC ............ *G02B 27/017* (2013.01); *G01C 21/206* (2013.01); *G02B 27/0093* (2013.01); *G06F 3/012* (2013.01); *G02B 2027/014* (2013.01); *G02B 2027/0138* (2013.01); *G02B 2027/0178* (2013.01)

(58) Field of Classification Search
CPC ............... G02B 27/017; G02B 7/0172; G02B 2027/0187; G02B 2027/014; G02B 2027/0178; G02B 2027/0138; G06F 3/011; G06F 3/012; G06F 3/013; G06T 19/006
USPC .................. 345/8, 633; 359/13, 630
See application file for complete search history.

(56) References Cited

U.S. PATENT DOCUMENTS

| | | | |
|---|---|---|---|
| 6,636,185 B1 | 10/2003 | Spitzer et al. | |
| 6,822,643 B2 * | 11/2004 | Matsui et al. | ............... 345/204 |
| 7,972,140 B2 | 7/2011 | Renaud | |
| 8,044,776 B2 | 10/2011 | Schofield et al. | |
| 8,066,376 B2 | 11/2011 | Wang et al. | |
| 2003/0020707 A1* | 1/2003 | Kangas et al. | ............... 345/418 |
| 2003/0095140 A1 | 5/2003 | Keaton et al. | |
| 2008/0243385 A1 | 10/2008 | Yamamoto et al. | |
| 2009/0213114 A1 | 8/2009 | Dobbins et al. | |

(Continued)

OTHER PUBLICATIONS

International Search Report & Written Opinion dated Apr. 25, 2014, in PCT Patent Application No. PCT/US2014/011183 filed Jan. 11, 2014, 10 Pages.

(Continued)

*Primary Examiner* — Koosha Sharifi-Tafreshi
(74) *Attorney, Agent, or Firm* — Dan Choi; Judy Yee; Micky Minhas

(57) ABSTRACT

A see through display apparatus includes a see-through, head mounted display and sensors on the display which detect audible and visual data in a field of view of the apparatus. A processor cooperates with the display to provide information to a wearer of the device using a behavior-based real object mapping system. At least a global zone and an egocentric behavioral zone relative to the apparatus are established, and real objects assigned behaviors that are mapped to the respective zones occupied by the object. The behaviors assigned to the objects can be used by applications that provide services to the wearer, using the behaviors as the foundation for evaluation of the type of feedback to provide in the apparatus.

19 Claims, 18 Drawing Sheets

(56) References Cited

U.S. PATENT DOCUMENTS

| | | | |
|---|---|---|---|
| 2011/0138317 A1* | 6/2011 | Kang et al. | 715/780 |
| 2011/0193939 A1* | 8/2011 | Vassigh | G06F 3/011 348/46 |
| 2011/0214082 A1* | 9/2011 | Osterhout et al. | 715/773 |
| 2012/0001938 A1* | 1/2012 | Sandberg | 345/633 |
| 2012/0059720 A1* | 3/2012 | Musabji | G01C 21/3638 705/14.58 |
| 2012/0176410 A1* | 7/2012 | Meier et al. | 345/633 |
| 2012/0194554 A1* | 8/2012 | Kaino et al. | 345/633 |
| 2012/0212499 A1 | 8/2012 | Haddick et al. | |
| 2013/0038510 A1 | 2/2013 | Brin et al. | |
| 2013/0044042 A1 | 2/2013 | Olsson et al. | |

OTHER PUBLICATIONS

Schneider, et al., "Vision System for Wearable and Robotic Uses", In Proceedings of the 17th International Symposium on Robot and Human Interactive Communication, Aug. 1, 2008, pp. 53-58.

Response to Written Opinion filed Dec. 19, 2014, in PCT Patent Application No. PCT/US2014/011183, 12 Pages.

Written Opinion dated Nov. 7, 2014, in PCT Patent Application No. PCT/US2014/011183 filed Jan. 11, 2014, 10 Pages.

Response to Office Action dated Oct. 23, 2015 in European Patent Application No. 14704196.6, 16 pages.

\* cited by examiner

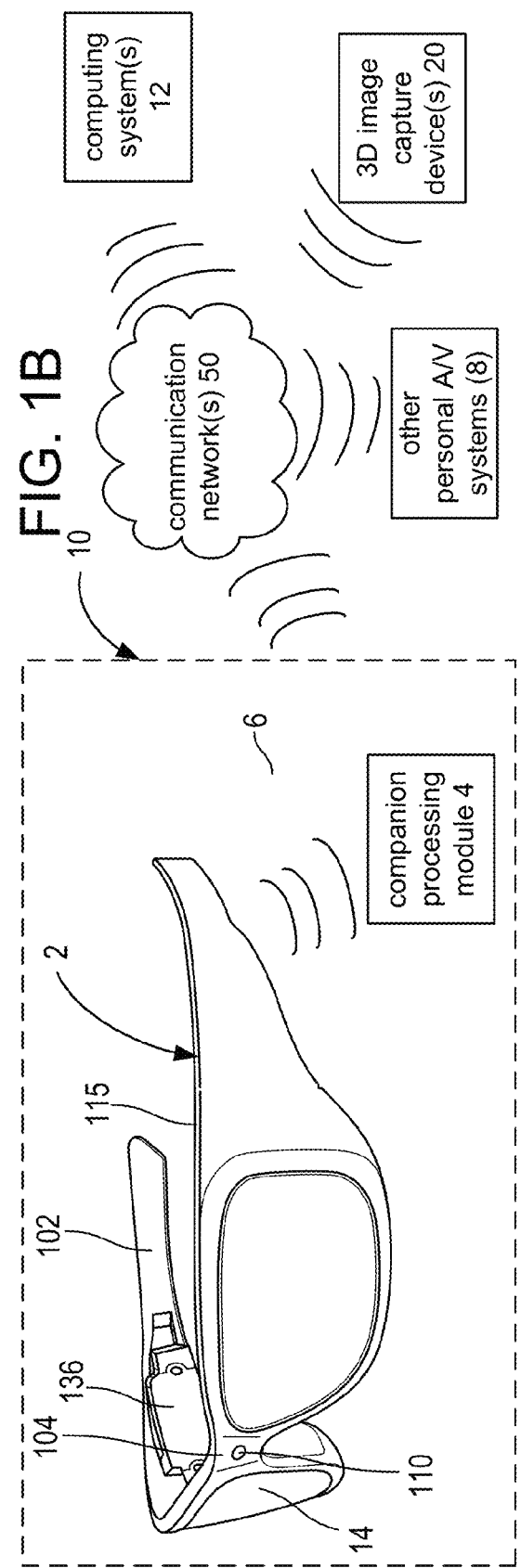

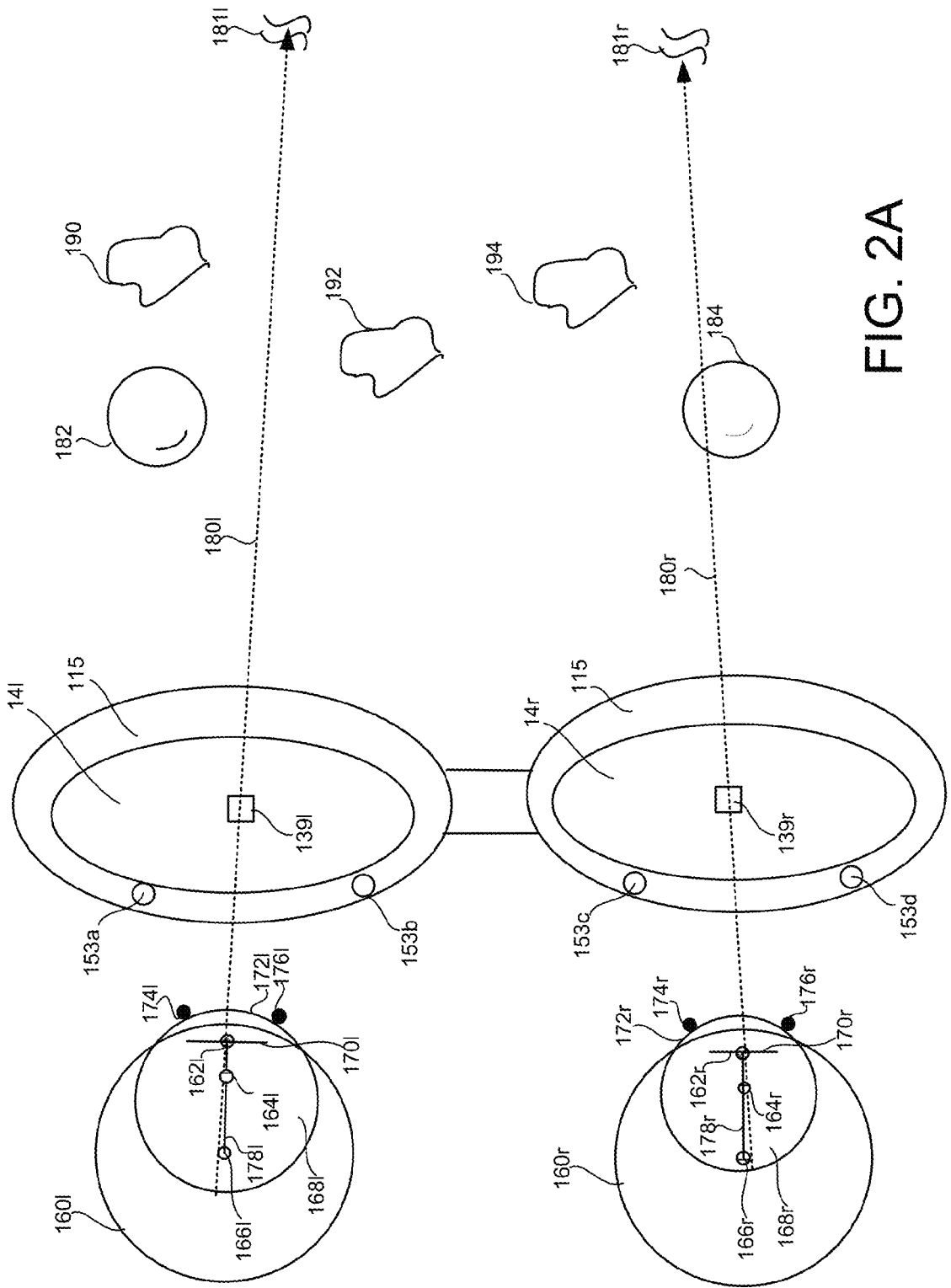

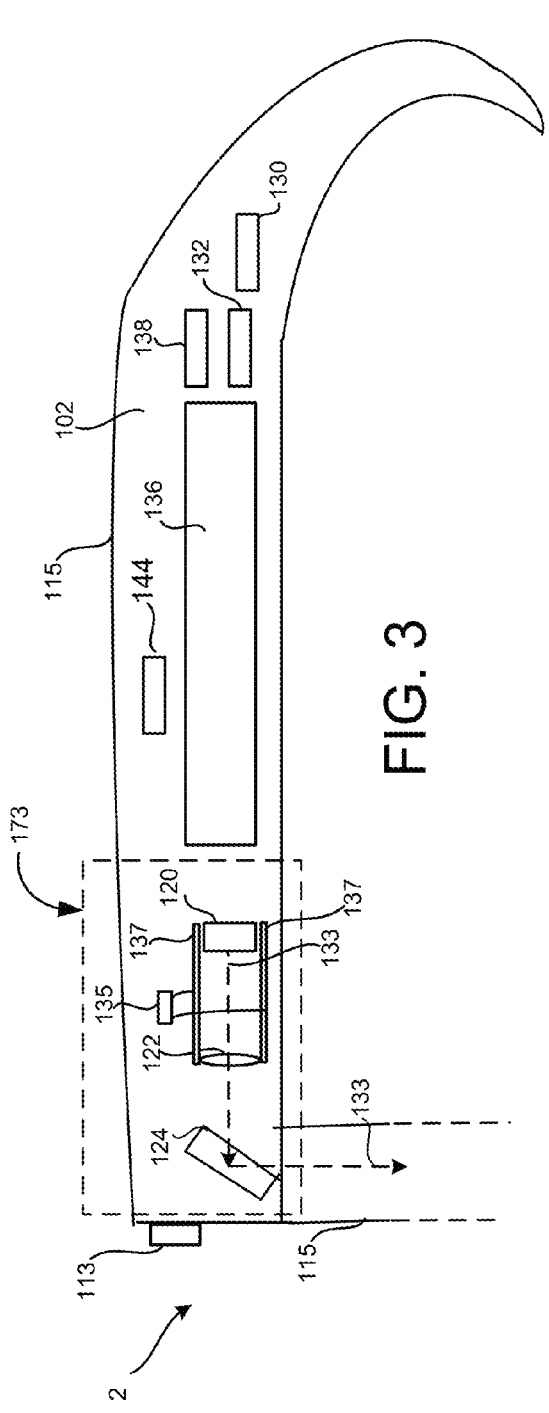
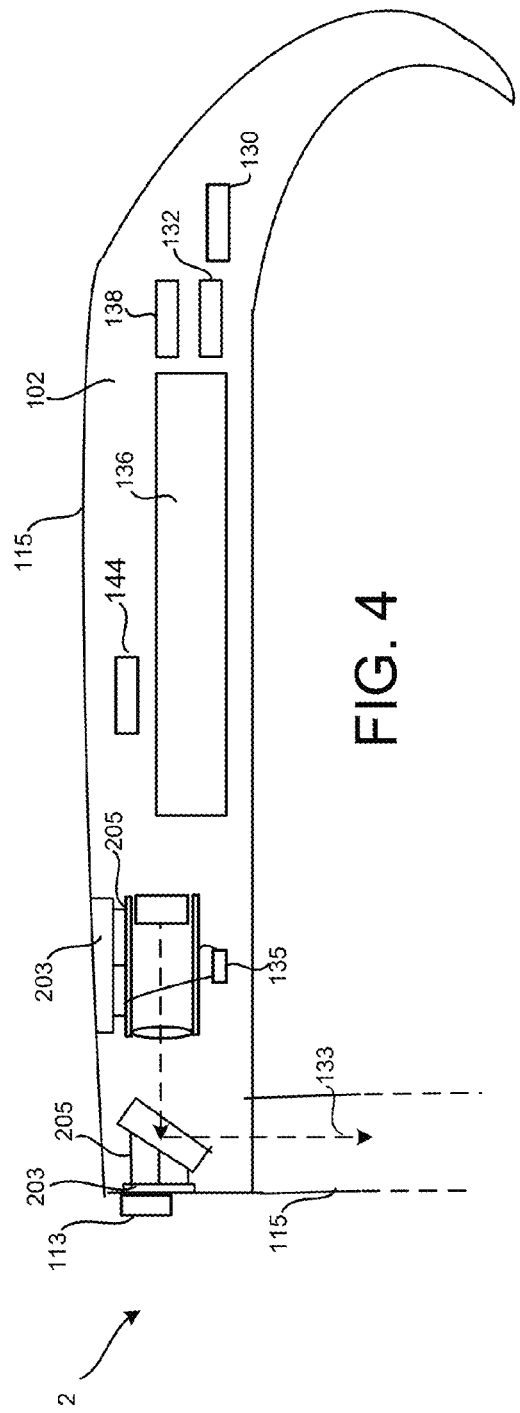

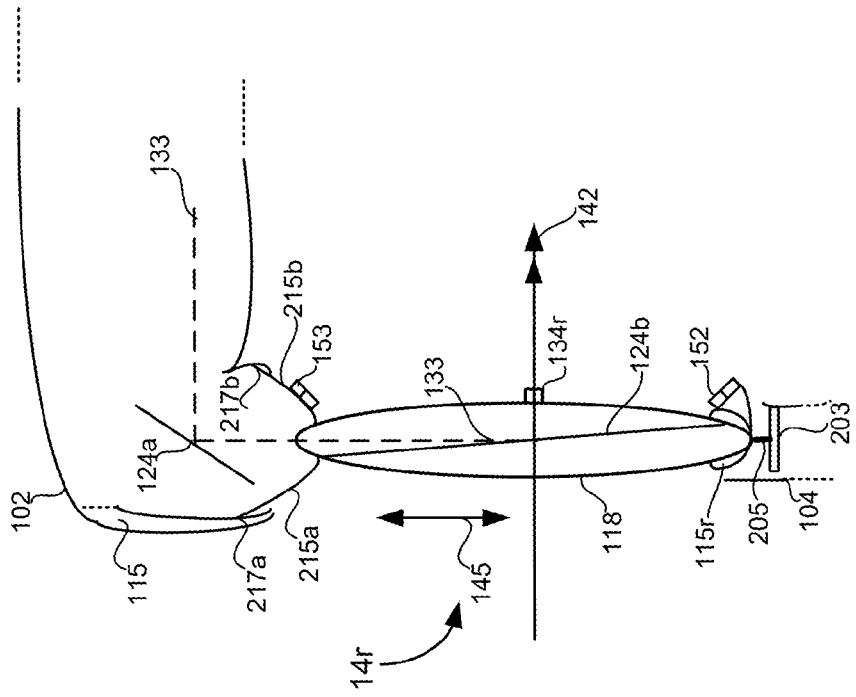
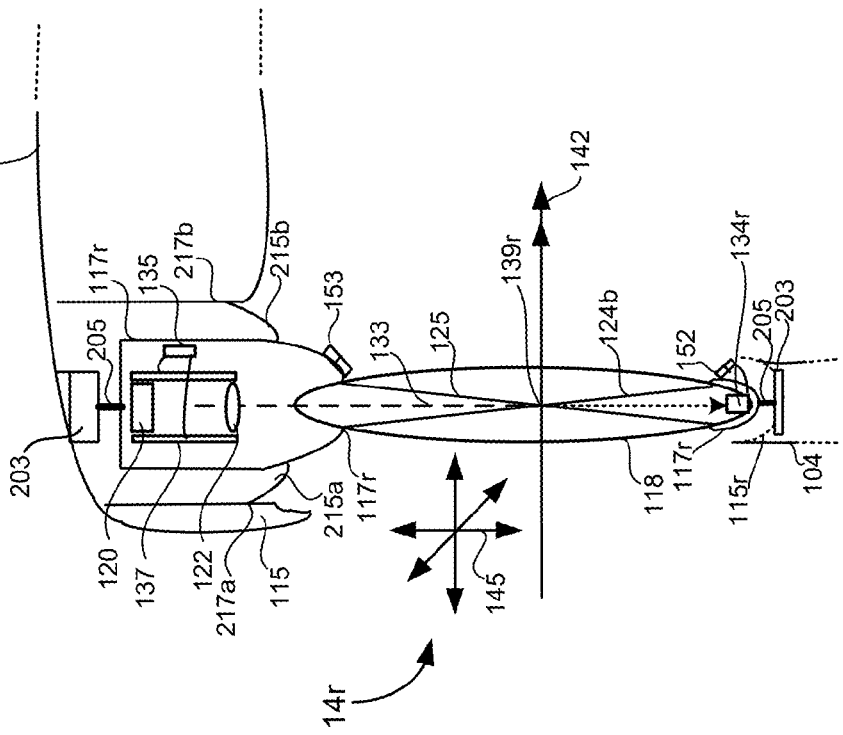

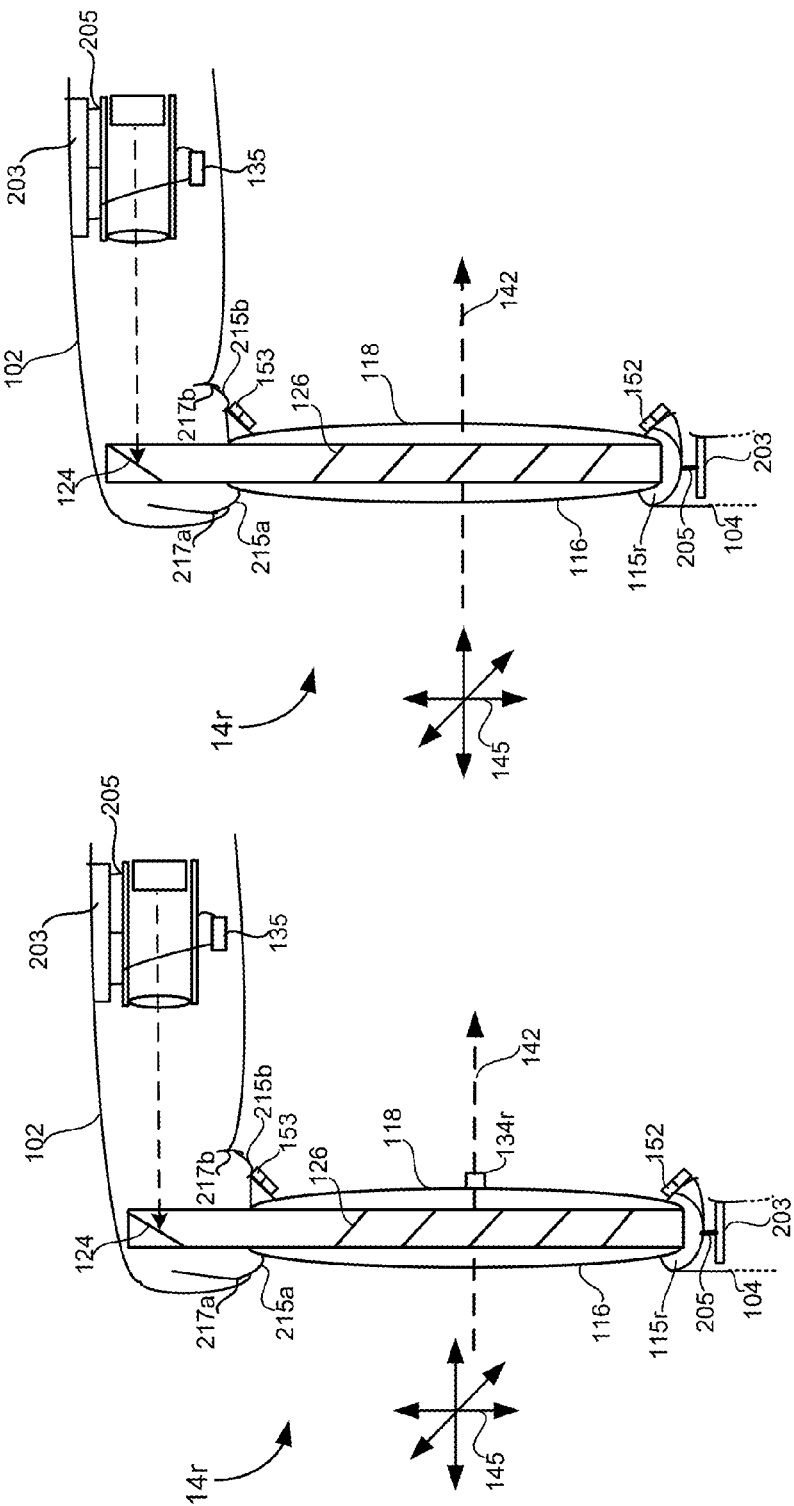

WEARABLE BEHAVIOR-BASED VISION SYSTEM

BACKGROUND

Mixed reality is a technology that allows virtual imagery to be mixed with a real world physical environment in a display. Systems for mixed reality may include, for example, see through head mounted displays or smart phones with built in cameras. Such systems typically include processing units which provide the imagery under the control of one or more applications.

Behavioral based analysis has been utilized in robotics as a framework for programming the actions of control systems. Some behavioral models in behavioral-robotics use layered sets of rules for object, with base-layer behaviors such as avoid-collision being the most basic. Behaviors are focused from the perspective of the actor or robot, and elemental behaviors used to produce advanced control systems.

In behavior-based system, the robot controller is organized as a collection of modules, called behaviors, that receive inputs from sensors and/or other behaviors, process the input, and send outputs to actuators and/or other behaviors. Each behavior generally serves some independent function, such as avoiding obstacles or homing to a goal location. All behaviors in a controller are executed in parallel, simultaneously receiving inputs and producing outputs.

SUMMARY

Technology is described to provide a behavior-based vision system in a see-through head mounted display device. A see through display apparatus includes a see-through, head mounted display and sensors on the display that detects audible and visual data in a field of view of the apparatus. A processor cooperates with the display to provide information to a wearer of the device using a behavior-based real object mapping system. At least a global and egocentric behavioral zone relative to the apparatus are established, and real objects assigned behaviors which are mapped to the respective zones occupied by the object. The behaviors assigned to the objects can be used by applications which provide services to the wearer, using the behaviors as the foundation for evaluation of the type of feedback to provide in the apparatus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1B is a block diagram depicting example components of another embodiment of a see-through, mixed reality display device with adjustable IPD.

FIG. 2A is a top view illustrating examples of gaze vectors extending to a point of gaze at a distance and a direction for aligning a far IPD.

FIG. 3 is a side view of an eyeglass temple in an eyeglasses embodiment of a mixed reality display device providing support for hardware and software components.

FIG. 4 is a side view of an eyeglass temple in an embodiment of a mixed reality display device providing support for hardware and software components and three-dimensional adjustment of a microdisplay assembly.

FIG. 5A is a top view of an embodiment of a movable display optical system 14 of a see-through, near-eye, mixed reality device.

FIG. 5B is a top view of another embodiment of a movable display optical system of a see-through, near-eye, mixed reality device including an arrangement of gaze detection elements FIG. 5C is a top view of a third embodiment of a movable display optical system of a see-through, near-eye, mixed reality device including an arrangement of gaze detection elements.

FIG. 5D is a top view of a fourth embodiment of a movable display optical system of a see-through, near-eye, mixed reality device including an arrangement of gaze detection elements.

DETAILED DESCRIPTION

The technology described herein includes a see-through, head mounted display device providing a wearer with a behavior-based vision system wherein real objects may be evaluated by the system relative to one or more user or global zones. The behaviors are core level behavioral actions of a wearer's interaction with the real object. Objects can be mapped to one or more zones and identified by positions relative to geographic locations or device scene mapping. Objects with mapped behaviors can be used by system applications to provide a wearer with environmental feedback.

The behavior-based system provides a framework allowing application developers to create applications of various types to provide services to the client based on real object definitions. The technology may be implemented in various types of vision systems which can provide feedback to a user, but in this disclosure is discussed with respect to use in a see-through, mixed reality display device.

FIGS. 1-6 illustrate an exemplary see-through, mixed reality display device suitable for implementing the system.

Figure 1A:
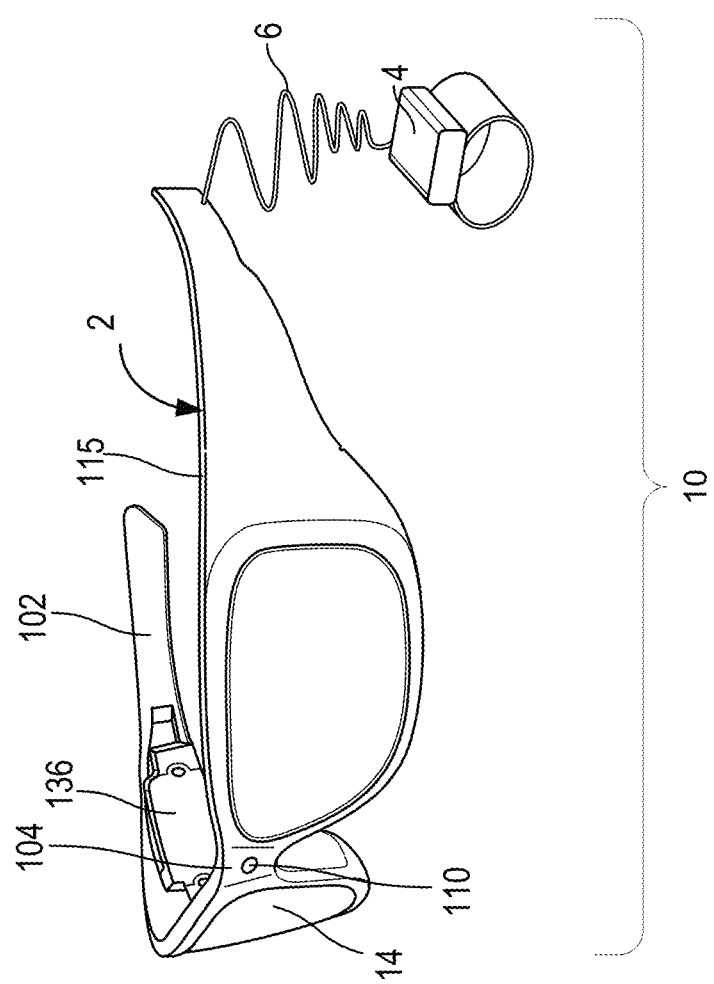
FIG. 1A is a block diagram depicting example components of one embodiment of a see-through, mixed reality display device with adjustable IPD in a system environment in which the device may operate.

FIG. 1A is a block diagram depicting example components of one embodiment of a see-through, mixed reality display device in a system environment in which the device may operate. In one embodiment, the technology implements a see through, near-eye display device. In other embodiments, see through display devices of different types may be used. System 10 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the wearer's body, e.g. the wrist in the illustrated example or in a pocket, and includes much of the computing power used to operate near-eye display device 2. Processing unit 4 may communicate wirelessly (e.g., WiFi, Bluetooth, infra-red, or other wireless communication means) to one or more computing systems, hot spots, cellular data networks, etc. In other embodiments, the functionality of the processing unit 4 may be integrated in software and hardware components of the display device 2.

See through head mounted display device 2, which in one embodiment is in the shape of eyeglasses in a frame 115, is worn on the head of a wearer so that the wearer can see through a display, embodied in this example as a display optical system 14 for each eye, and thereby have an actual direct view of the space in front of the wearer. The use of the term "actual direct view" refers to the ability to see real world objects directly with the human eye, rather than seeing created image representations of the objects. For example, looking through glass at a room allows a wearer to have an actual direct view of the room, while viewing a video of a room on a television is not an actual direct view of the room. Based on the context of executing software, for example, a gaming application, the system can project images of virtual objects, sometimes referred to as virtual images or holograms, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a wearer's ears. Temple 102 is representative of an embodiment of the right temple and includes control circuitry 136 for the display device 2. Nose bridge 104 of the frame includes a microphone 110 for recording sounds and transmitting audio data to processing unit 4.

FIG. 1B is a block diagram depicting example components of another embodiment of a see-through, mixed reality display device. In some embodiments, processing unit 4 is a separate unit which may be worn on the wearer's body, e.g. a wrist, or be a separate device like a mobile device (e.g. smartphone). The processing unit 4 may communicate wired or wirelessly (e.g., WiFi, Bluetooth, infrared, RFID transmission, wireless Universal Serial Bus (USB), cellular, 3G, 4G or other wireless communication means) over a communication network 50 to one or more computing systems 12 whether located nearby or at a remote location. In other embodiments, the functionality of the processing unit 4 may be integrated in software and hardware components of the display device 2.

One or more remote, network accessible computer system(s) 12 may be leveraged for processing power and remote data access. An example of hardware components of a computing system 12 is shown in FIG. 16. An application may be executing on computing system 12 which interacts with or performs processing for an application executing on one or more processors in the see-through, augmented reality display system 10. For example, a 3D mapping application may be executing on the one or more computer systems 12 and the wearer's display system 10.

Additionally, in some embodiments, the applications executing on other see through head mounted display systems 10 in same environment or in communication with each other share data updates in real time, for example object identifications and occlusion data like an occlusion volume for a real object, in a peer-to-peer configuration between devices or to object management service executing in one or more network accessible computing systems.

The shared data in some examples may be referenced with respect to one or more referenced coordinate systems accessible to the device 2. In other examples, one head mounted display (HMD) device may receive data from another HMD device including image data or data derived from image data, position data for the sending HMD, e.g. GPS or IR data giving a relative position, and orientation data. An example of data shared between the HMDs is depth map data including image data and depth data captured by its front facing cameras 113, object identification data, and occlusion volumes for real objects in the depth map. The real objects may still be unidentified or have been recognized by software executing on the HMD device or a supporting computer system, e.g. 12 or another display system 10.

An example of an environment is a 360 degree visible portion of a real location in which the wearer is situated. A wearer may be looking at a subset of his environment which is his field of view. For example, a room is an environment. A person may be in a house and be in the kitchen looking at the top shelf of the refrigerator. The top shelf of the refrigerator is within his display field of view, the kitchen is his environment, but his upstairs bedroom is not part of his current environment as walls and a ceiling block his view of the upstairs bedroom. Of course, as he moves, his environment changes. Some other examples of an environment may be a ball field, a street location, a section of a store, a customer section of a coffee shop and the like. A location can include multiple environments, for example, the house may be a location. The wearer and his friends may be wearing their display device systems for playing a game which takes place throughout the house. As each player moves about the house, his environment changes. Similarly, a perimeter around several blocks may be a location and different intersections provide different environments to view as different cross streets come into view. In some instances, a location can also be an environment depending on the precision of location tracking sensors or data.

FIG. 2A is a top view illustrating examples of gaze vectors extending to a point of gaze at a distance and direction for aligning a far inter-pupillary distance (IPD). FIG. 2A illustrates examples of gaze vectors intersecting at a point of gaze where a wearer's eyes are focused effectively at infinity, for example beyond five (5) feet, or, in other words, examples of gaze vectors when the wearer is looking straight ahead. A model of the eyeball 160l, 160r is illustrated for each eye based on the Gullstrand schematic eye model. For each eye, an eyeball 160 is modeled as a sphere with a center 166 of rotation and includes a cornea 168 modeled as a sphere too and having a center 164. The cornea rotates with the eyeball, and the center 166 of rotation of the eyeball may be treated as a fixed point. The cornea covers an iris 170 with a pupil 162 at its center. In this example, on the surface 172 of the respective cornea are glints 174 and 176.

In the illustrated embodiment of FIG. 2A, a sensor detection area 139 (139*l* and 139*r*) is aligned with the optical axis of each display optical system 14 within an eyeglass frame 115. The sensor associated with the detection area is a camera in this example capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d*. Through the display optical systems, 14*l* and 14*r* in the eyeglass frame 115, the wearer's field of view includes both real objects 190, 192 and 194 and virtual objects 182, 184, and 186.

The axis 178 formed from the center 166 of rotation through the cornea center 164 to the pupil 162 is the optical axis of the eye. A gaze vector 180 is sometimes referred to as the line of sight or visual axis which extends from the fovea through the center of the pupil 162. The fovea is a small area of about 1.2 degrees located in the retina. The angular offset between the optical axis computed and the visual axis has horizontal and vertical components. The horizontal component is up to 5 degrees from the optical axis, and the vertical component is between 2 and 3 degrees. In many embodiments, the optical axis is determined and a small correction is determined through wearer calibration to obtain the visual axis which is selected as the gaze vector.

For each wearer, a virtual object may be displayed by the display device at each of a number of predetermined positions at different horizontal and vertical positions. An optical axis may be computed for each eye during display of the object at each position, and a ray modeled as extending from the position into the wearer eye. A gaze offset angle with horizontal and vertical components may be determined based on how the optical axis is to be moved to align with the modeled ray. From the different positions, an average gaze offset angle with horizontal or vertical components can be selected as the small correction to be applied to each computed optical axis. In some embodiments, a horizontal component is used for the gaze offset angle correction.

The gaze vectors 180*l* and 180*r* are not perfectly parallel as the vectors become closer together as they extend from the eyeball into the field of view at a point of gaze which is effectively at infinity as indicated by the symbols 181*l* and 181*r*. At each display optical system 14, the gaze vector 180 appears to intersect the optical axis upon which the sensor detection area 139 is centered. In this configuration, the optical axes are aligned with the inter-pupillary distance (IPD). When a wearer is looking straight ahead, the IPD measured is also referred to as the far IPD.

When identifying an object for a wearer to focus on for aligning IPD at a distance, the object may be aligned in a direction along each optical axis of each display optical system. Initially, the alignment between the optical axis and wearer's pupil is not known. For a far IPD, the direction may be straight ahead through the optical axis. When aligning near IPD, the identified object may be in a direction through the optical axis, however due to vergence of the eyes at close distances, the direction is not straight ahead although it may be centered between the optical axes of the display optical systems.

Figure 2B:
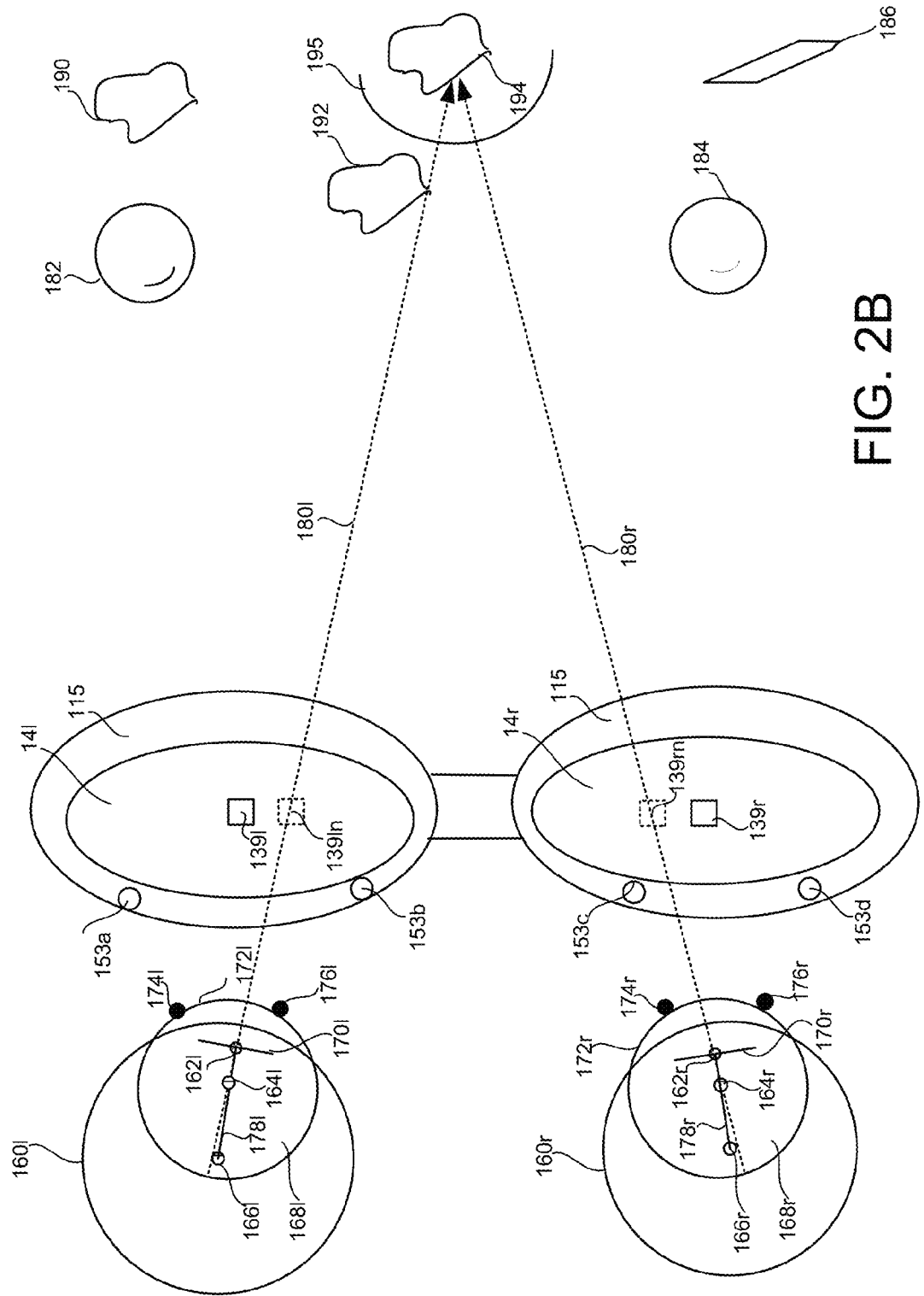
FIG. 2B is a top view illustrating examples of gaze vectors extending to a point of gaze at a distance and a direction for aligning a near IPD.

FIG. 2B is a top view illustrating examples of gaze vectors extending to a point of gaze at a distance and a direction for aligning a near IPD. In this example, the cornea 168*l* of the left eye is rotated to the right or towards the wearer's nose, and the cornea 168*r* of the right eye is rotated to the left or towards the wearer's nose. Both pupils are gazing at a real object 194 at a much closer distance, for example two (2) feet in front of the wearer. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the wearer is looking at real object 194. At such a distance, as the eyeballs rotate inward, the distance between their pupils decreases to a near IPD. The near IPD is typically about 4 mm less than the far IPD. A near IPD distance criteria, e.g. a point of gaze at less than four feet for example, may be used to switch or adjust the IPD alignment of the display optical systems 14 to that of the near IPD. For the near IPD, each display optical system 14 may be moved toward the wearer's nose so the optical axis, and detection area 139, moves toward the nose a few millimeters as represented by detection areas 139*ln* and 139*rn*.

Techniques for automatically determining a wearer's IPD and automatically adjusting the STHMD to set the IPD for optimal wearer viewing, are discussed in co-pending U.S. patent application Ser. No. 13/221,739 entitled Gaze Detection In A See-Through, Near-Eye, Mixed Reality Display; U.S. patent application Ser. No. 13/221,707 entitled Adjustment Of A Mixed Reality Display For Inter-Pupillary Distance Alignment; and U.S. patent application Ser. No. 13/221,662 entitled Aligning Inter-Pupillary Distance In A Near-Eye Display System, all of which are hereby incorporated specifically by reference.

FIG. 3 illustrates an exemplary arrangement of a see through, near-eye, mixed reality display device embodied as eyeglasses with movable display optical systems including gaze detection elements. What appears as a lens for each eye represents a display optical system 14 for each eye, e.g. 14*r* and 14*l*. A display optical system includes a see-through lens, e.g. 118 and 116 in FIGS. 5A-5*b*, as in an ordinary pair of glasses, but also contains optical elements (e.g. mirrors, filters) for seamlessly fusing virtual content with the actual direct real world view seen through the lenses 118, 116. A display optical system 14 has an optical axis which is generally in the center of the see-through lens 118, 116 in which light is generally collimated to provide a distortionless view. For example, when an eye care professional fits an ordinary pair of eyeglasses to a wearer's face, a goal is that the glasses sit on the wearer's nose at a position where each pupil is aligned with the center or optical axis of the respective lens resulting in generally collimated light reaching the wearer's eye for a clear or distortionless view.

In an exemplary display device 2, a detection area of at least one sensor is aligned with the optical axis of its respective display optical system so that the center of the detection area is capturing light along the optical axis. If the display optical system is aligned with the wearer's pupil, each detection area of the respective sensor is aligned with the wearer's pupil. Reflected light of the detection area is transferred via one or more optical elements to the actual image sensor of the camera in this example illustrated by dashed line as being inside the frame 115.

In one example, a visible light camera (also commonly referred to as an RGB camera) may be the sensor. An example of an optical element or light directing element is a visible light reflecting mirror which is partially transmissive and partially reflective. The visible light camera provides image data of the pupil of the wearer's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In other examples, the at least one sensor is an IR camera or a position sensitive detector (PSD) to which the IR radiation may be directed. For example, a hot reflecting surface may transmit visible light but reflect IR radiation. The IR radiation reflected from the eye may be from incident radiation of illuminators, other IR illuminators (not shown) or from ambient IR radiation reflected off the eye. In some examples, sensor may be a combination of an RGB and an IR camera, and the light directing elements may include a visible light reflecting or diverting element and an IR radiation reflecting or diverting element. In some examples, a camera may be small, e.g. 2 millimeters (mm) by 2 mm.

Various types of gaze detection systems are suitable for use in the present system. In some embodiments which calculate a cornea center as part of determining a gaze vector, two glints, and therefore two illuminators will suffice. However, other embodiments may use additional glints in determining a pupil position and hence a gaze vector. As eye data representing the glints is repeatedly captured, for example at 30 frames a second or greater, data for one glint may be blocked by an eyelid or even an eyelash, but data may be gathered by a glint generated by another illuminator.

FIG. 3 is a side view of an eyeglass temple 102 of the frame 115 in an eyeglasses embodiment of a see-through, mixed reality display device. At the front of frame 115 is physical environment facing video camera 113 that can capture video and still images. Particularly in some embodiments, physical environment facing camera 113 may be a depth camera as well as a visible light or RGB camera. For example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light camera (RGB camera) and depth cameras can be used. More information about depth cameras can be found in U.S. patent application Ser. No. 12/813,675, filed on Jun. 11, 2010, incorporated herein by reference in its entirety. The data from the sensors may be sent to a processor 210 of the control circuitry 136, or the processing unit 4 or both which may process them but which the processing unit 4 may also send to a computer system over a network or secondary computing system for processing. The processing identifies objects through image segmentation and edge detection techniques and maps depth to the objects in the wearer's real world field of view. Additionally, the physical environment facing camera 113 may also include a light meter for measuring ambient light.

Control circuitry 136 provide various electronics that support the other components of head mounted display device 2. More details of control circuitry 136 are provided below with respect to FIGS. 6A and 6B. Inside, or mounted to temple 102, are ear phones (or speakers) 130, inertial sensors 132, GPS transceiver 144 and temperature sensor 138. In one embodiment inertial sensors 132 include a three axis magnetometer 132A, three axis gyro 132B and three axis accelerometer 132C (See FIG. 6A). The inertial sensors are for sensing position, orientation, and sudden accelerations of head mounted display device 2. From these movements, head position may also be determined.

The display device 2 provides an image generation unit which can create one or more images including one or more virtual objects. In some embodiments a microdisplay may be used as the image generation unit. A microdisplay assembly 173 in this example comprises light processing elements and a variable focus adjuster 135. An example of a light processing element is a microdisplay 120. Other examples include one or more optical elements such as one or more lenses of a lens system 122 and one or more reflecting elements such as reflective elements 124a and 124b in FIGS. 5A and 5B or 124 in FIGS. 5C and 5D. Lens system 122 may comprise a single lens or a plurality of lenses.

Mounted to or inside temple 102, the microdisplay 120 includes an image source and generates an image of a virtual object. The microdisplay 120 is optically aligned with the lens system 122 and the reflecting element 124 or reflecting elements 124a and 124b as illustrated in the following Figures. The optical alignment may be along an optical path 133 including one or more optical axes. The microdisplay 120 projects the image of the virtual object through lens system 122, which may direct the image light, onto reflecting element 124 which directs the light into lightguide optical element 112 as in FIGS. 5C and 5D or onto reflecting element 124a (e.g. a mirror or other surface) which directs the light of the virtual image to a partially reflecting element 124b which combines the virtual image view along path 133 with the natural or actual direct view along the optical axis 142 as in FIGS. 5A-5D. The combination of views are directed into a wearer's eye.

The variable focus adjuster 135 changes the displacement between one or more light processing elements in the optical path of the microdisplay assembly or an optical power of an element in the microdisplay assembly. The optical power of a lens is defined as the reciprocal of its focal length, e.g. 1/focal length, so a change in one effects the other. The change in focal length results in a change in the region of the field of view, e.g. a region at a certain distance, which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120 in this example. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

In one example, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

There are different image generation technologies that can be used to implement microdisplay 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

FIG. 4 is a side view of an eyeglass temple in another embodiment of a mixed reality display device providing support for hardware and software components and three dimensional adjustment of a microdisplay assembly. Some of the numerals illustrated in the FIG. 5A above have been removed to avoid clutter in the drawing. In embodiments where the display optical system 14 is moved in any of three dimensions, the optical elements represented by reflecting element 124 and the other elements of the microdisplay assembly 173, e.g. 120, 122 may also be moved for maintaining the optical path 133 of the light of a virtual image to the display optical system. An XYZ transport mechanism in this example made up of one or more motors represented by display adjustment mechanism 203 and shafts 205 under control of the processor 210 of control circuitry 136 (see FIG. 6A) control movement of the elements of the microdisplay assembly 173. An example of motors which may be used are piezoelectric motors. In the illustrated example, one motor is attached to the armature 137 and moves the variable focus adjuster 135 as well, and another display adjustment mechanism 203 controls the movement of the reflecting element 124.

FIG. 5A is a top view of an embodiment of a movable display optical system 14 of a see-through, near-eye, mixed reality device 2 including an arrangement of gaze detection elements. A portion of the frame 115 of the near-eye display device 2 will surround a display optical system 14 and provides support for elements of an embodiment of a microdisplay assembly 173 including microdisplay 120 and its accompanying elements as illustrated. In order to show the components of the display system 14, in this case display optical system 14r for the right eye system, a top portion of the frame 115 surrounding the display optical system is not depicted. Additionally, the microphone 110 in bridge 104 is not shown in this view to focus attention on the operation of the display adjustment mechanism 203. As in the example of FIG. 5A, the display optical system 14 in this embodiment is moved by moving an inner frame 117r, which in this example surrounds the microdisplay assembly 173 as well. The display adjustment mechanism 203 is embodied in this embodiment provided as three axis motors which attach their shafts 205 to inner frame 117r to translate the display optical system 14, which in this embodiment includes the microdisplay assembly 173, in any of three dimensions as denoted by symbol 145 indicating three (3) axes of movement.

The display optical system 14 in this embodiment has an optical axis 142 and includes a see-through lens 118 allowing the wearer an actual direct view of the real world. In this example, the see-through lens 118 is a standard lens used in eye glasses and can be made to any prescription (including no prescription). In another embodiment, see-through lens 118 can be replaced by a variable prescription lens. In some embodiments, see-through, near-eye display device 2 will include additional lenses.

The display optical system 14 further comprises reflecting reflective elements 124a and 124b. In this embodiment, light from the microdisplay 120 is directed along optical path 133 via a reflecting element 124a to a partially reflective element 124b embedded in lens 118 which combines the virtual object image view traveling along optical path 133 with the natural or actual direct view along the optical axis 142 so that the combined views are directed into a wearer's eye, right one in this example, at the optical axis, the position with the most collimated light for a clearest view.

A detection area of a light sensor is also part of the display optical system 14r. An optical element 125 embodies the detection area by capturing reflected light from the wearer's eye received along the optical axis 142 and directs the captured light to the sensor 134r, in this example positioned in the lens 118 within the inner frame 117r. As shown, the arrangement allows the detection area 139 of the sensor 134r to have its center aligned with the center of the display optical system 14. For example, if sensor 134r is an image sensor, sensor 134r captures the detection area 139, so an image captured at the image sensor is centered on the optical axis because the detection area 139 is. In one example, sensor 134r is a visible light camera or a combination of RGB/IR camera, and the optical element 125 includes an optical element which reflects visible light reflected from the wearer's eye, for example a partially reflective mirror.

In other embodiments, the sensor 134r is an IR sensitive device such as an IR camera, and the element 125 includes a hot reflecting surface which lets visible light pass through it and reflects IR radiation to the sensor 134r. An IR camera may capture not only glints, but also an infra-red or near infra-red image of the wearer's eye including the pupil.

In other embodiments, the IR sensor 134r is a position sensitive device (PSD), sometimes referred to as an optical position sensor. The depiction of the light directing elements, in this case reflecting elements, 125, 124, 124a and 124b in FIGS. 5A-5D are representative of their functions. The elements may take any number of forms and be implemented with one or more optical components in one or more arrangements for directing light to its intended destination such as a camera sensor or a wearer's eye.

As discussed in FIGS. 2A and 2B above and in the Figures below, when the wearer is looking straight ahead, and the center of the wearer's pupil is centered in an image captured of the wearer's eye when a detection area 139 or an image sensor 134r is effectively centered on the optical axis of the display, the display optical system 14r is aligned with the pupil. When both display optical systems 14 are aligned with their respective pupils, the distance between the optical centers matches or is aligned with the wearer's inter-pupillary distance. In the example of FIG. 5A, the inter-pupillary distance can be aligned with the display optical systems 14 in three dimensions.

In one embodiment, if the data captured by the sensor 134 indicates the pupil is not aligned with the optical axis, one or more processors in the processing unit 4 or the control circuitry 136 or both use a mapping criteria which correlates a distance or length measurement unit to a pixel or other discrete unit or area of the image for determining how far off the center of the pupil is from the optical axis 142. Based on the distance determined, the one or more processors determine adjustments of how much distance and in which direction the display optical system 14r is to be moved to align the optical axis 142 with the pupil. Control signals are applied by one or more display adjustment mechanism drivers 245 to each of the components, e.g. display adjustment mechanism 203, making up one or more display adjustment mechanisms 203. In the case of motors in this example, the motors move their shafts 205 to move the inner frame 117r in at least one direction indicated by the control signals. On the temple side of the inner frame 117r are flexible sections 215a, 215b of the frame 115 which are attached to the inner frame 117r at one end and slide within grooves 217a and 217b within the interior of the temple frame 115 to anchor the inner frame 117 to the frame 115 as the display optical system 14 is move in any of three directions for width, height or depth changes with respect to the respective pupil.

In addition to the sensor, the display optical system 14 includes other gaze detection elements. In this embodiment, attached to frame 117r on the sides of lens 118, are at least two (2) but may be more, infra-red (IR) illuminators 153 which direct narrow infra-red light beams within a particular wavelength range or about a predetermined wavelength at the wearer's eye to each generate a respective glint on a surface of the respective cornea. In other embodiments, the illuminators and any photodiodes may be on the lenses, for example at the corners or edges. In this embodiment, in addition to the at least 2 infra-red (IR) illuminators 153 are IR photodetectors 152. Each photodetector 152 is sensitive to IR radiation within the particular wavelength range of its corresponding IR illuminator 153 across the lens 118 and is positioned to detect a respective glint. In the case where the sensor 134 is an IR sensor, the photodetectors 152 may not be needed or may be an additional glint data capture source. With a visible light camera, the photodetectors 152 capture light from glints and generate glint intensity values.

In FIGS. 5A-5D, the positions of the gaze detection elements, e.g. the detection area 139 and the illuminators 153 and photodetectors 152 are fixed with respect to the optical axis of the display optical system 14. These elements may move with the display optical system 14r, and hence its optical axis, on the inner frame, but their spatial relationship to the optical axis 142 does not change.

FIG. 5B is a top view of another embodiment of a movable display optical system of a see-through, near-eye, mixed reality device including an arrangement of gaze detection elements. In this embodiment, light sensor 134r may be embodied as a visible light camera, sometimes referred to as an RGB camera, or it may be embodied as an IR camera or a camera capable of processing light in both the visible and IR ranges, e.g. a depth camera. In this example, the image sensor 134r is the detection area 139r. The image sensor 134 of the camera is located vertically on the optical axis 142 of the display optical system. In some examples, the camera may be located on frame 115 either above or below see-through lens 118 or embedded in the lens 118. In some embodiments, the illuminators 153 provide light for the camera, and in other embodiments the camera captures images with ambient lighting or light from its own light source. Image data captured may be used to determine alignment of the pupil with the optical axis. Gaze determination techniques based on image data, glint data or both may be used based on the geometry of the gaze detection elements.

In this example, the display adjustment mechanism 203 in bridge 104 moves the display optical system 14r in a horizontal direction with respect to the wearer's eye as indicated by directional symbol 145. The flexible frame portions 215a and 215b slide within grooves 217a and 217b as the system 14 is moved. In this example, reflecting element 124a of a microdisplay assembly 173 embodiment is stationary. As the IPD is typically determined once and stored, any adjustment of the focal length between the microdisplay 120 and the reflecting element 124a that may be done may be accomplished by the microdisplay assembly, for example via adjustment of the microdisplay elements within the armature 137.

FIG. 5C is a top view of a third embodiment of a movable display optical system of a see-through, near-eye, mixed reality device including an arrangement of gaze detection elements. The display optical system 14 has a similar arrangement of gaze detection elements including IR illuminators 153 and photodetectors 152, and a light sensor 134r located on the frame 115 or lens 118 below or above optical axis 142. In this example, the display optical system 14 includes a light guide optical element 112 as the reflective element for directing the images into the wearer's eye and is situated between an additional see-through lens 116 and see-through lens 118. As reflecting element 124 is within the lightguide optical element and moves with the element 112, an embodiment of a microdisplay assembly 173 is attached on the temple 102 in this example to a display adjustment mechanism 203 for the display optical system 14 embodied as a set of three axis mechanism 203 with shafts 205 include at least one for moving the microdisplay assembly. One or more display adjustment mechanism 203 on the bridge 104 are representative of the other components of the display adjustment mechanism 203 which provides three axes of movement. In another embodiment, the display adjustment mechanism may operate to move the devices via their attached shafts 205 in the horizontal direction. The mechanism 203 for the microdisplay assembly 173 would also move it horizontally for maintaining alignment between the light coming out of the microdisplay 120 and the reflecting element 124. A processor 210 of the control circuitry (see FIG. 6A) coordinates their movement.

Lightguide optical element 112 transmits light from microdisplay 120 to the eye of the wearer wearing head mounted display device 2. Lightguide optical element 112 also allows light from in front of the head mounted display device 2 to be transmitted through lightguide optical element 112 to the wearer's eye thereby allowing the wearer to have an actual direct view of the space in front of head mounted display device 2 in addition to receiving a virtual image from microdisplay 120. Thus, the walls of lightguide optical element 112 are see-through. Lightguide optical element 112 includes a first reflecting element 124 (e.g., a mirror or other surface). Light from microdisplay 120 passes through lens system 122 and becomes incident on reflecting element 124. The reflecting element 124 reflects the incident light from the microdisplay 120 such that light is trapped inside a planar, substrate comprising lightguide optical element 112 by internal reflection.

After several reflections off the surfaces of the substrate, the trapped light waves reach an array of selectively reflecting surfaces 126. Note that only one of the five surfaces 126 to prevent over-crowding of the drawing. Reflecting surfaces 126 couple the light waves incident upon those reflecting surfaces out of the substrate into the eye of the wearer. In one embodiment, each eye will have its own lightguide optical element 112.

FIG. 5D is a top view of a fourth embodiment of a movable display optical system of a see-through, near-eye, mixed reality device including an arrangement of gaze detection elements. This embodiment is similar to FIG. 5C's embodiment including a light guide optical element 112. However, the only light detectors are the IR photodetectors 152, so this embodiment relies on glint detection only for gaze detection as discussed in the examples below.

In the embodiments of FIGS. 5A-5D, the positions of the gaze detection elements, e.g. the detection area 139 and the illuminators 153 and photodetectors 152 are fixed with respect to each other. In these examples, they are also fixed in relation to the optical axis of the display optical system 14.

In the embodiments above, the specific number of lenses shown are just examples. Other numbers and configurations of lenses operating on the same principles may be used. Additionally, in the examples above, only the right side of the see-through, near-eye display device 2 are shown. A full near-eye, mixed reality display device would include as examples another set of lenses 116 and/or 118, another lightguide optical element 112 for the embodiments of FIGS. 5C and 5D, another microdisplay 120, another lens system 122, likely another environment facing camera 113, another eye tracking sensor 134, earphones 130, and a temperature sensor 138.

Figure 6A:
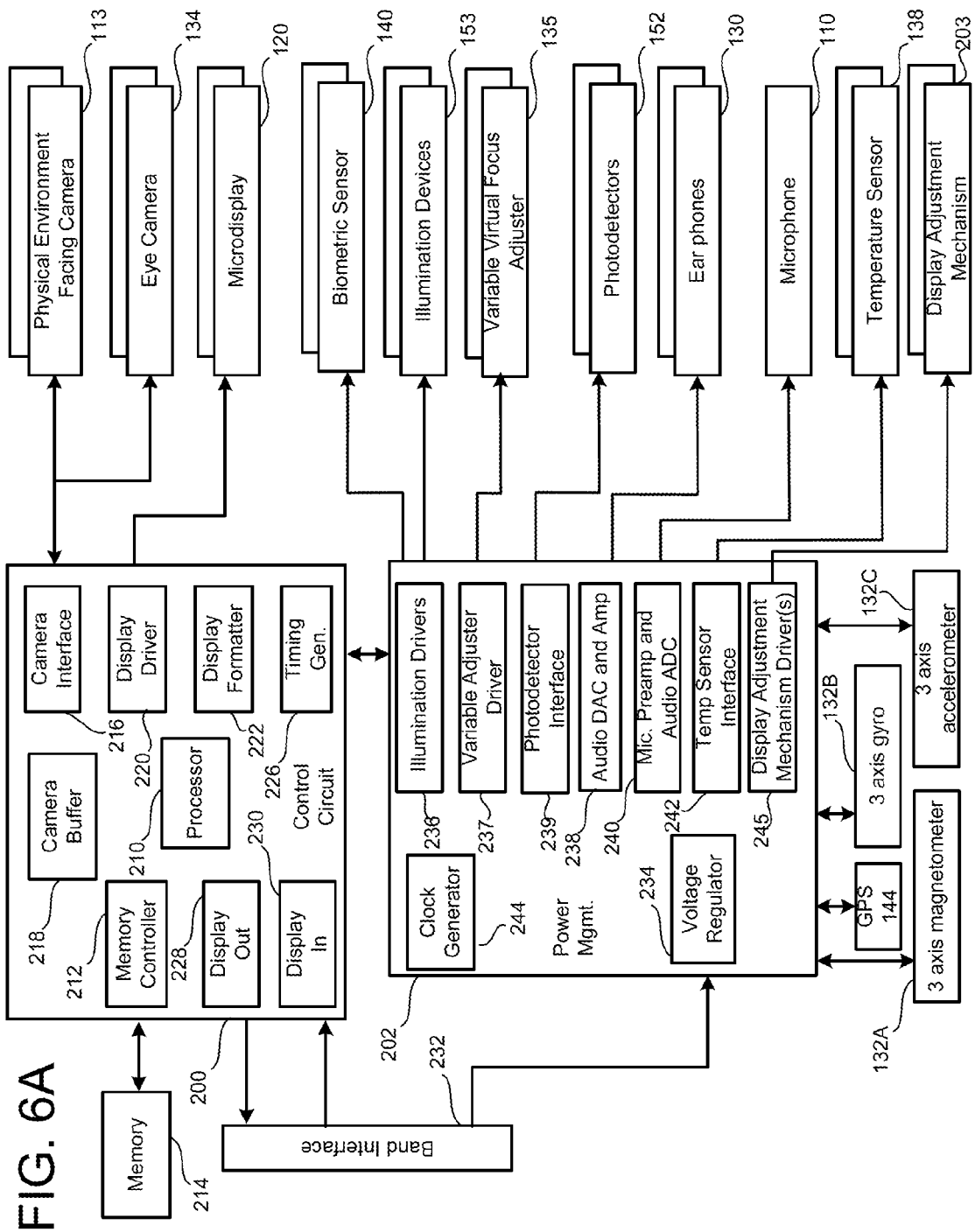
FIG. 6A is a block diagram of one embodiment of the hardware and software components of a processing unit associated with a see-though, head mounted display device.
Figure 6B:
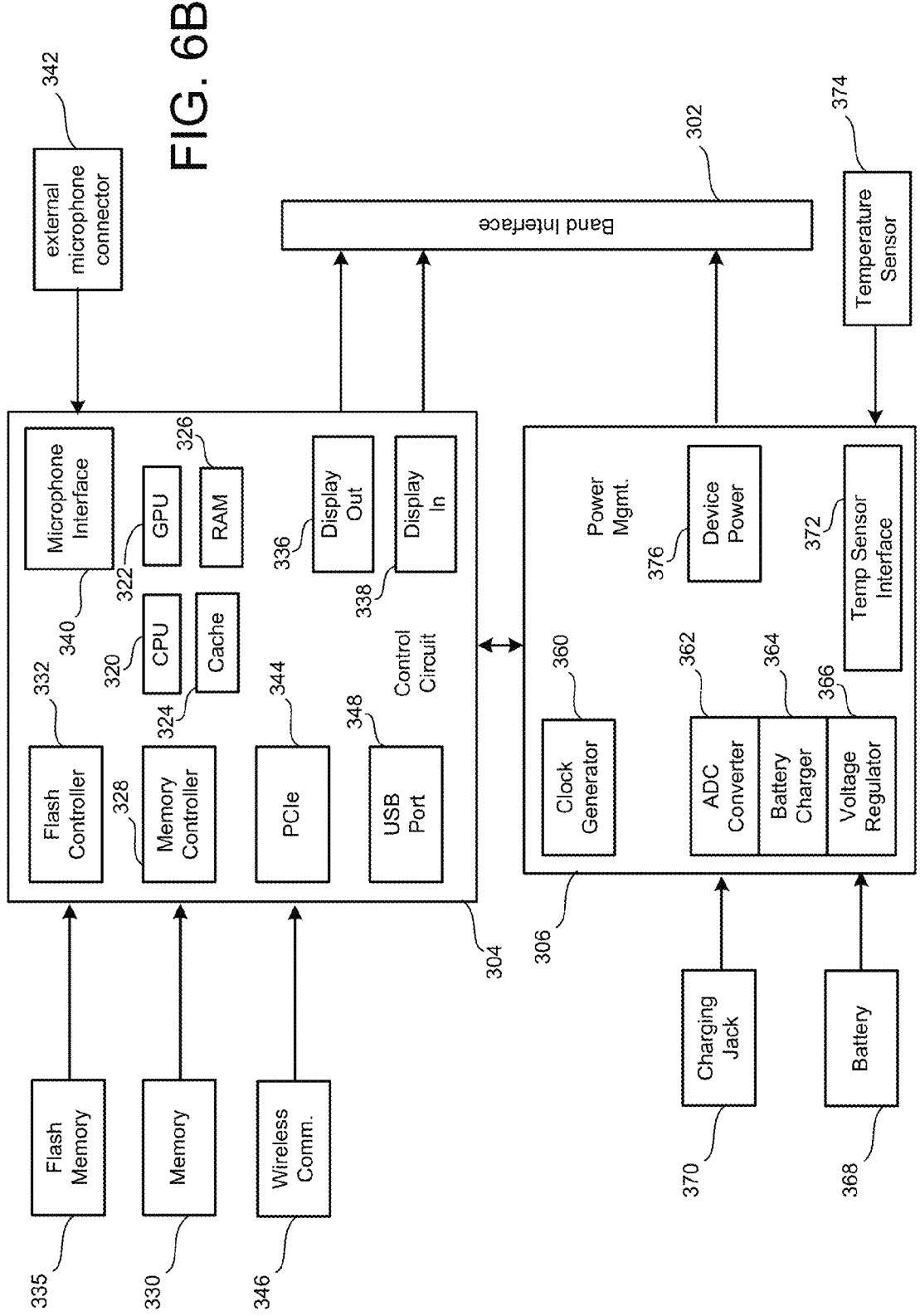
FIG. 6B is a block diagram describing the various components of a processing unit 4.

FIG. 6A is a block diagram of one embodiment of hardware and software components of a see-through, near-eye, mixed reality display unit 2 as may be used with one or more embodiments. FIG. 6B is a block diagram describing the various components of a processing unit 4. In this embodiment, near-eye display device 2, receives instructions about a virtual image from processing unit 4 and provides the sensor information back to processing unit 4. Software and hardware components which may be embodied in a processing unit 4 are depicted in FIG. 6B, will receive the sensory information from the display device 2 (See FIG. 1A). Based on that information, processing unit 4 will determine where and when to provide a virtual image to the wearer and send instructions accordingly to the control circuitry 136 of the display device 2.

Note that some of the components of FIG. 6A (e.g., physical environment facing camera 113, eye sensor 134, variable virtual focus adjuster 135, detection area 139, microdisplay 120, illuminators 153, earphones 130, temperature sensor 138, display adjustment mechanism 203) are shown in shadow to indicate that there are at least two of each of those devices, at least one for the left side and at least one for the right side of head mounted display device 2. FIG. 6A shows the control circuit 200 in communication with the power management unit 202. Control circuit 200 includes processor 210, memory controller 212 in communication with memory 214 (e.g., D-RAM), camera interface 216, camera buffer 218, display driver 220, display formatter 222, timing generator 226, display out 228, and display in interface 230. In one embodiment, all of components of driver 220 are in communication with each other via dedicated lines of one or more buses. In another embodiment, each of the components of control circuit 200 are in communication with processor 210.

Camera interface 216 provides an interface to the two physical environment facing cameras 113 and each eye sensor 134 and stores respective images received from the cameras 113, sensor 134 in camera buffer 218. Display driver 220 will drive microdisplay 120. Display formatter 222 may provide information, about the virtual image being displayed on microdisplay 120 to one or more processors of one or more computer systems, e.g. 4, 210 performing processing for the augmented reality system. Timing generator 226 is used to provide timing data for the system. Display out 228 is a buffer for providing images from physical environment facing cameras 113 and the eye sensors 134 to the processing unit 4. Display in 230 is a buffer for receiving images such as a virtual image to be displayed on microdisplay 120. Display out 228 and display in 230 communicate with band interface 232 which is an interface to processing unit 4.

Power management unit 202 includes voltage regulator 234, eye tracking illumination driver 236, variable adjuster driver 237, photodetector interface 239, audio DAC and amplifier 238, microphone preamplifier and audio ADC 240, temperature sensor interface 242, display adjustment mechanism driver(s) 245 and clock generator 244. Voltage regulator 234 receives power from processing unit 4 via band interface 232 and provides that power to the other components of head mounted display device 2. Illumination driver 236 controls, for example via a drive current or voltage, the illuminators 153 to operate about a predetermined wavelength or within a wavelength range. Audio DAC and amplifier 238 receives the audio information from earphones 130. Microphone preamplifier and audio ADC 240 provides an interface for microphone 110. Temperature sensor interface 242 is an interface for temperature sensor 138. One or more display adjustment drivers 245 provide control signals to one or more motors or other devices making up each display adjustment mechanism 203 which represent adjustment amounts of movement in at least one of three directions. Power management unit 202 also provides power and receives data back from three axis magnetometer 132A, three axis gyro 132B and three axis accelerometer 132C. Power management unit 202 also provides power and receives data back from and sends data to GPS transceiver 144. In one embodiment, a biometric sensor 140 including for example a heartbeat sensor may be provided.

The variable adjuster driver 237 provides a control signal, for example a drive current or a drive voltage, to the adjuster 135 to move one or more elements of the microdisplay assembly 173 to achieve a displacement for a focal region calculated by software executing in a processor 210 of the control circuitry 13, or the processing unit 4, or both. In embodiments of sweeping through a range of displacements and, hence, a range of focal regions, the variable adjuster driver 237 receives timing signals from the timing generator 226, or alternatively, the clock generator 244 to operate at a programmed rate or frequency.

The photodetector interface 239 performs any analog to digital conversion needed for voltage or current readings from each photodetector, stores the readings in a processor readable format in memory via the memory controller 212, and monitors the operation parameters of the photodetectors 152 such as temperature and wavelength accuracy.

FIG. 6B is a block diagram of one embodiment of the hardware and software components of a processing unit 4 associated with a see-through, near-eye, mixed reality display unit. The processing unit 4 may include this embodiment of hardware and software components as well as similar components which perform similar functions. FIG. 6B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 335 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication component 346, and USB port(s) 348.

In one embodiment, wireless communication component 346 can include a Wi-Fi enabled communication device, Bluetooth communication device, infrared communication device, etc. The USB port can be used to dock the processing unit 4 to a secondary computing device in order to load data or software onto processing unit 4, as well as charge processing unit 4. In one embodiment, CPU 320 and GPU 322 are the main workhorses for determining where, when and how to insert images into the view of the wearer.

Power management circuit 306 includes clock generator 360, analog to digital converter 362, battery charger 364, voltage regulator 366, see-through, near-eye display power interface 376, and temperature sensor interface 372 in communication with temperature sensor 374 (located on the wrist band of processing unit 4). An alternating current to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

The system described above can be used to add virtual images to a wearer's view such that the virtual images are mixed with real images that the wearer see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905,952, "Fusing Virtual Content Into Real Content," filed on Oct. 15, 2010; both applications are incorporated herein by reference in their entirety.

To provide a mixed reality environment wherein virtual objects rendered by a display device interact with real objects in the field of view of a wearer, an object-centric tracking system is implemented. The object-centric tracking system uses a data definition for each instance of a real world object and a rendered virtual object. This allows each processing unit 4 and computing system 12 to understand and process objects, both real and virtual, in a manner that is consistent across all devices and allows each rendering device to perform the calculations to render correct interactions between the objects in the field of view.

The object-centric tracking system includes a data definition for each real object. The data for a real object may include a definition of the object's shape, appearance, and/or other information allowing sensors on the device to detect the object. The data definition may include a geographical location for the object.

The data definition for a real object may include a behavioral definition or behavioral primitive comprising a rule defining how a wearer of a device 2 would interact with the real object. The behaviors are elemental, allowing applications to process data definitions as necessary to provide services to the wearer.

Figure 7:
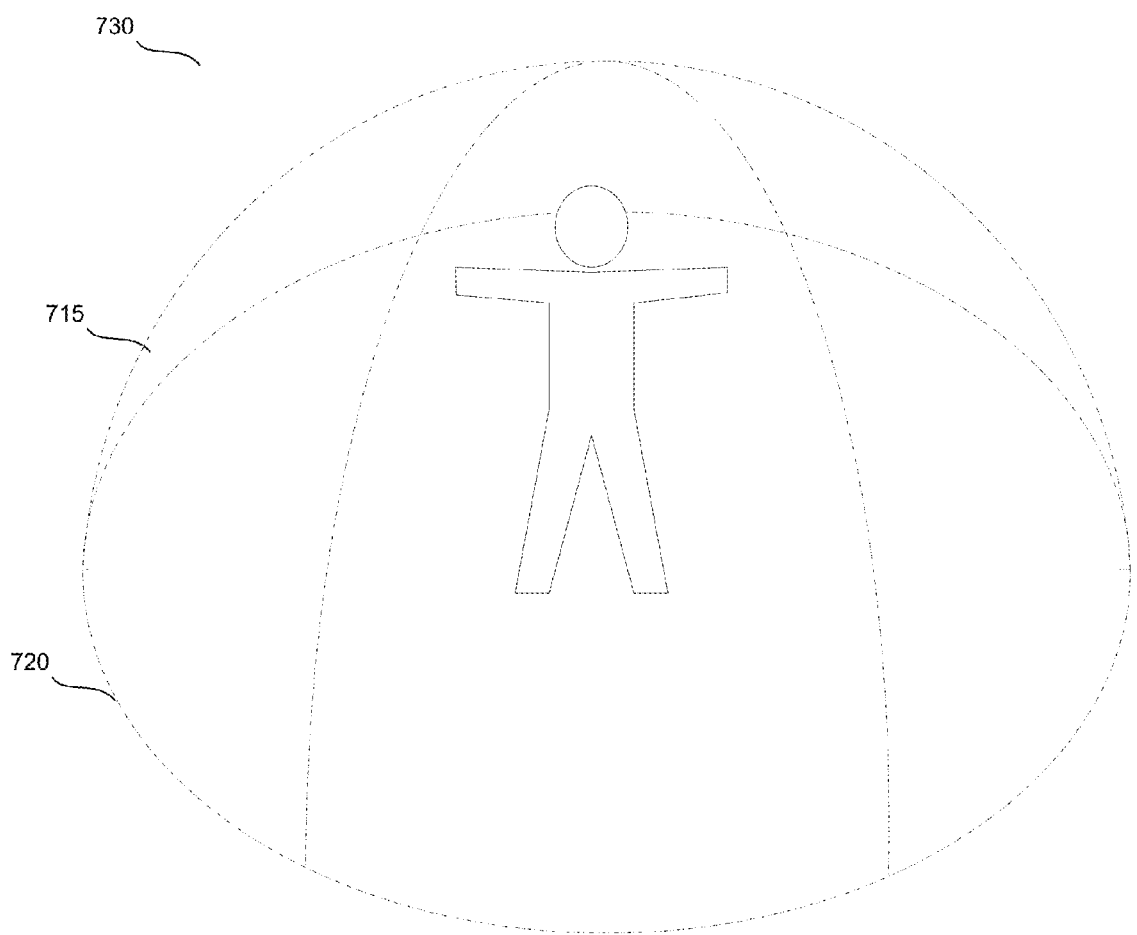
FIG. 7 is a depiction of a user's touch zone, egocentric zone and global zone.

FIG. 7 illustrates different behavioral zones for a user 700. A first, egocentric zone 720 is within the range of what a user can physically touch. The egocentric zone 720 is anything that user can perceive using user senses. The egocentric zone surrounds the body of the user and is generally proximate to the user. A global zone 730 encompasses all objects registered to a global space and may encompass the egocentric zone. As discussed herein, each physical object within one of the zones 720, and 730, is associated with a particular user behavior defined for that object. The behavioral definitions for each object within the zone can be utilized by applications accessing a vision system to provide various types of feedback and facilities to a user wearing the vision system. In the present disclosure, the vision system is a see-through, head mounted display system capable of mixed reality rendering. Other zone definitions may be provided. A touch zone 710 may encompass all objects within physical reach of a user, while a sight zone 715 may encompass objects within sight of the user.

The behavioral zones map out egocentric, global and other spaces to segment zones which contain different types of information that relate to behavior of real objects within each zone. The results of this mapping can be used to provide a wearer of a device 2 with additional information such as localization and proximity to sites of interest, alerts to impending danger such as collision with a car or avoiding an unforeseen step in the pavement.

Real objects within each zone are determined from global positioning information within the global zone and from scene mapping in the egocentric zone, and behavioral primitives (core behaviors) mapped to the objects can be used as the building blocks for processes performed by applications to provide the wearer of a device 2 with information bout the wearer's environment.

Behaviors are associated with each zone. Interactive behaviors are generally not associated with the global zone. Interactive behaviors generally relate to a wearer's egocentric zone. For example, the area out of reach over a user's head would be outside the user's egocentric zone and constrain any behaviors to those not including user interaction with an object. Behaviors FIG. 7 illustrates three different zones, but any number of user centric or global zones may be utilized in the present technology. Each zone may have different types of behavioral primitives assigned to object definitions. For example, a "touch" behavioral primitive would not likely be relevant in a global zone.

Figure 8:
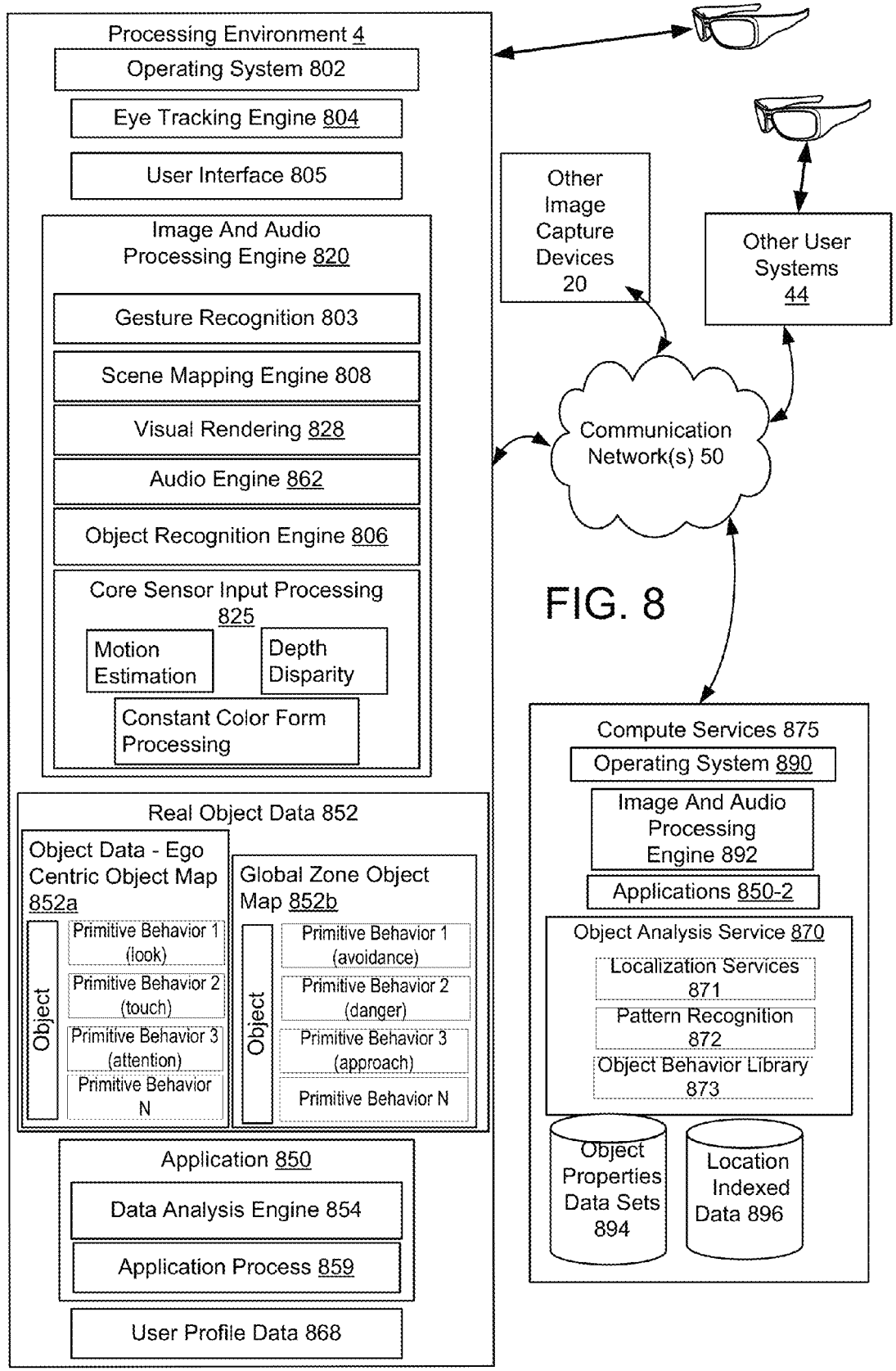
FIG. 8 is a depiction of functional components of a system including a processing environment having a behavior based vision system and supporting compute services.

FIG. 8 illustrates the functional components of a processing environment suitable for implementing the present technology, including a local processing unit 4 and a remote, network connected processing environment providing additional compute services 875 to the local processing unit 4. FIG. 8 is a block diagram of the system from a software perspective for providing an emotion detection system in see through head mounted mixed reality display. FIG. 8 illustrates a computing environment from a software perspective which may be implemented by personal computing apparatus in conjunction with one or more remote computing systems to provide compute services 875 in communication with one or more personal AV apparatus, or a combination of these. Network connectivity allows leveraging available computing services 875.

As discussed above, each device 2 may communicate with an accompanying processing device 4. Other capture devices 20 may be utilized to provide real object data to the compute services 875. Devices 20 may comprise, for example, two-dimensional imaging devices or three dimensional imaging devices. Other user systems 44 may include processing units 4 and display devices 2, all communicating via network 50 with compute services 875.

As shown in the embodiment of FIG. 8, the software components of a processing unit 4 comprise an operating system 802, eye tracking engine 804, a user interface 805, image and audio processing engine 820, a feedback application 850, and user profile data 868.

Operating system 802 provides the underlying structure to allow hardware elements in the processing unit 4 to interact with the higher level functions of the functional components shown in FIG. 8.

Eye tracking engine 804 tracks the wearer gaze with respect to movements of the eye relative to the device 2. Eye tracking engine 804 can identify the gaze direction or a point of gaze based on people position and eye movements and determine a command or request.

A user interface 805 allows a user to manipulate the applications and other aspects of the system, and provides visual and audible feedback to the wearer.

Image and audio processing engine 820 processes image data (e.g. video or image), depth and audio data received from one or more capture devices which may be available from the device. Image and depth information may come from outward facing sensors captured as the wearer moves his or her body.

Gesture recognition engine 803 can identify actions performed by a wearer indicating a control and identify real world objects within a user field of view. In one embodiment, the gesture recognition 803 includes a collection of gesture filters, each comprising information concerning a gesture that may be performed by at least a part of a skeletal model. The gesture recognition engine 803 compares skeletal model and movements associated with it derived from the captured image added to gesture filters in a gesture library to identify when a wearer has performed one or more gestures. Gestures can be used to control various aspects of device 2 and processing unit 4. Image and audio processing engine 820 processes image data depth and audio data received from one or more captured devices which might be available in a given location.

A 3D mapping of the wearer field of view of the mixed reality display device 2 can be determined by the scene mapping engine 808, based on captured image data and depth data for the display field of view. A depth map can represent the captured image data and depth data. A view dependent coordinate system may be used for mapping of the display field of view as how a collision between virtual objects appears to a wearer depends on the wearer's point of view. An example of the view dependent coordinate system is an X, Y, Z, coordinate system in which the Z-axis or depth axis extends orthogonally or as a normal from the front of a see through display device 2. In some examples, the image and depth data for the depth map are presented in the display field of view is received from cameras 113 on the front of display device 2. Objects in the display field of view may be determined remotely or using a set of environment data which is previously provided based on a previous mapping using the scene mapping engine 808 or from the compute services 875.

Visual rendering engine 828 renders visual elements in the wearer display, which can include instances of three dimensional holographic virtual objects, two dimensional images, colors and other information within the display of a display device 2. Visual rendering engine 828 works in conjunction with application 850 to render application specific elements in a display and elements in the user interface 805.

An audio recognition and rendering engine 862 interprets input from audio inputs such as microphone 110, and generates output to the earphones or speakers 130.

Core sensor input processing 825 performs a base set of data manipulation on sensor input data from device 2. This core manipulation may include motion estimation processing, depth disparity determination and color change processing. Each type of sensor input—visual, audio, depth, position, orientation—from device 2 may be processed by core sensor input processing 825. The output of the sensor input processing 825 and/or the output of the object recognition engine 806 may be used by the application 850 in conjunction with primitive behaviors assigned to objects to complete the objectives of the application 850.

Object recognition engine 806 translates sensor data from device 2 into recognized real objects by comparing sensor data to object data representing the physical characteristics of real world objects. Object recognition engine 806 can then map object data to characteristics and behavior data within the egocentric or touch-centric spaces (or other spaces). Alternatively, real object data may be provided by an object analysis service 870 from compute services 875. The object analysis service 870 includes localization services, pattern recognition and an object behavior library 873.

Real object data 852 includes object data for real world objects and associated behaviors mapped to behavioral zones. Real object data includes, for example, an egocentric zone map 852a and a global zone map 852b. Real object data may include information allowing sensor data to identify the object using vision and depth data, location information for the object, and one or more associated behavioral primitives. The behavioral primitive is an element reflecting the behavior of the object relative to the wearer. Examples of behaviors include "danger", "avoidance", "touch", "look", and the like. Any N number of behaviors may be included in the system and any number of behaviors may be associated with an object.

Real objects may be mapped to an egocentric map or a world zone map. The egocentric map defines objects relative to the wearer of the device 2, while the global zone map defines object data relative to world reference points. Using the scene mapping engine 808 and object recognition engine 806, the device 2 can determine physical structure and objects in the world that surrounds the wearer, thereby mapping out egocentric space. Each map contains different types of behavioral primitives defining the behavior of real object in the world relative to the user. The results of this computation can be used by the application 850 to provide the wearer with additional information such as localization and proximity to sites of interest, alerts to impending danger such as collision with a car or avoiding an unforeseen step in the pavement.

Application 850 can be any of a number of applications designed to use behavior-based data to provide services to a wearer of device 2. Application 850 includes an application process 858, and a data analysis engine 854. The application process 858 comprises one or more processes which implement the function of the application. For example, a visual warning application may be designed to alert the wearer to dangers detected by the device. The visual warning application process would analyze object data and core sensor processing, determine whether a warning should be issued to a wearer of device 2, and use the visual and/or audio rendering to provide the warning. A navigation application may be designed to show the wearer the most effective rout to a destination. A shopping application may be designed to draw the user's attention to items the user wants or needs. Each of these functions is provided by application processes 858 in conjunction with the real object data 852 and the data analysis engine.

The data analysis engine 854 provides application specific processing of core sensor input and object data. Application processes 858 may use specific types of input from device sensors in order to make a determination. A warning application, for example, may use a rapid change in depth data in one or more spaces as an indication that some warning should be provided to the user in a region of the device display.

Compute services 875 provided additional resources to enable application 850 to complete its functions. To get services 875 to include an operating system 890, image and audio processing engine 892, additional applications 850-2, an object analysis service 870, object properties data sets 894 and location indexed data 896. Compute services 875 may be implemented on one or more processing devices such as those of the various embodiments described herein.

The image and audio processing engine 892 can provide additional computing power to process input data from processing unit 4, and may include elements such as a gesture recognition component, a scene mapping engine, and core sensor input processing.

Applications 850-2 may comprise various applications which utilize behavior-based objects to provide services to users. Applications 850-2 may provide services from the compute services 875 or may be downloaded to the processing unit 4 for implementation.

Object analysis service 870 may provide additional object data for real objects in the global space or in the egocentric space. Location services 871 allow matching location indexed data 896 on objects at various globally addressed locations to be provided to the processing unit 4. Pattern recognition 872 provides additional processing power allowing raw input data from the processing unit 4 to be provided to the services 875 and returned to the processing unit 4. An object behavior library 873 allows matching of object properties in an object properties data set 894 to behavioral primitives for known, discovered or detected objects in any of the behavioral spaces.

Figure 9:
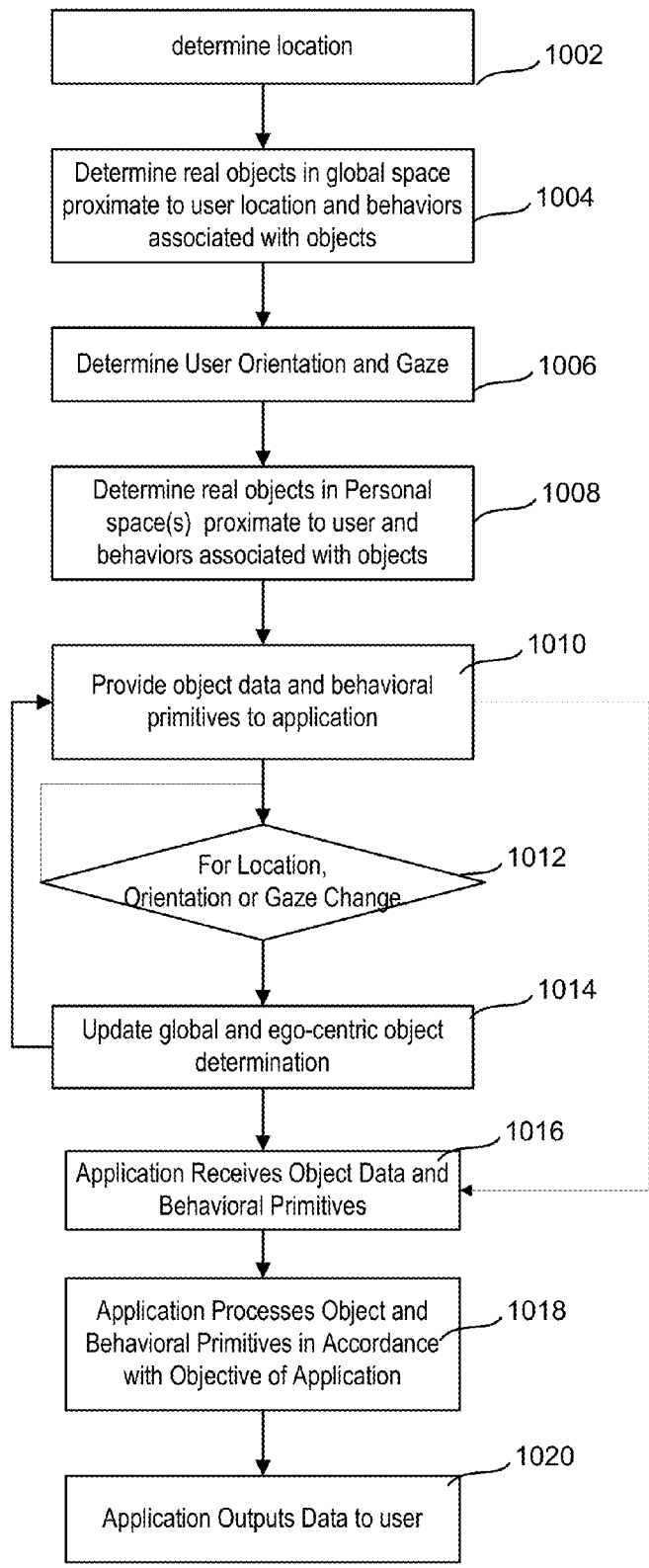
FIG. 9 is a flowchart illustrating a process for providing a behavioral based vision system.

FIG. 9 is a flowchart illustrating a method for providing behavioral based object data to an application in accordance with the technology described herein. The method of FIG. 9 may be implemented by the processing device 4, the compute services 875, or a combination thereof. At step 1002, a location is determined for the wearer a device 2. The location may be determined by any number of various means including GPS data, terrain mapping, or other geo-location estimation techniques, such as using geo-location referenced wireless access points. At step 1004, real objects in global space which are some distance proximate to the user location are determined, and behaviors are associated with the objects. Once the location of the user is known, then determination of objects which are proximate to the user can be made available to the processing unit 4. The determination of objects in the global space proximate to the use may take place by any number of techniques. A distance relative to a wearer location may be used to determine which objects may be relevant to the wearer. All of a subset of objects in a global space proximate to the user may be provided by the compute services by reference to the location indexed data 896. Real objects in the world space can be stored in the object data 852, or location index data 896. Real objects in world space generally comprise objects that fixed with respect to global space and can be referenced by location coordinates. Such objects can include, for example, roads, buildings, geographic features, and other real objects which may be of interest to a wearer of the device 2.

At step 1006, user's orientation and gaze are determined using the techniques described above for the device 2. Once the user's orientation and gaze are determined, real objects in the egocentric space proximate to the user can be determined and behaviors can be associated with those objects at 1008. Objects in the egocentric space are determined by the scene mapping engine comparing input data from the device 2 to known characteristics of objects. For example, a table and a door will have parameters (a two dimensional image map or a three dimensional depth map, for example), which can be identified by the scene-mapping engine. Once the real object is identified, behaviors can be associated with the known objects. At step 1010, real object data for both the global space data and the egocentric space data is provided to an application, such as application 850, along with behavioral primitives for each object. As the user moves their orientation and gaze at 1012, global and egocentric object determination and behavioral associations are updated at 1016. Step 1014 may be considered equivalent to steps 1002 through 1008 for each new location and each new gaze/orientation. At 1016, an application receives the object data and behavioral primitives and at 1018 the application can process the object and behavioral primitives in accordance with the objectives of the particular application. The application can subsequently provide feedback and data on the real objects to a user in accordance with is purpose at 1020. Two different types of applications are illustrated in the subsequent figures.

Figure 10:
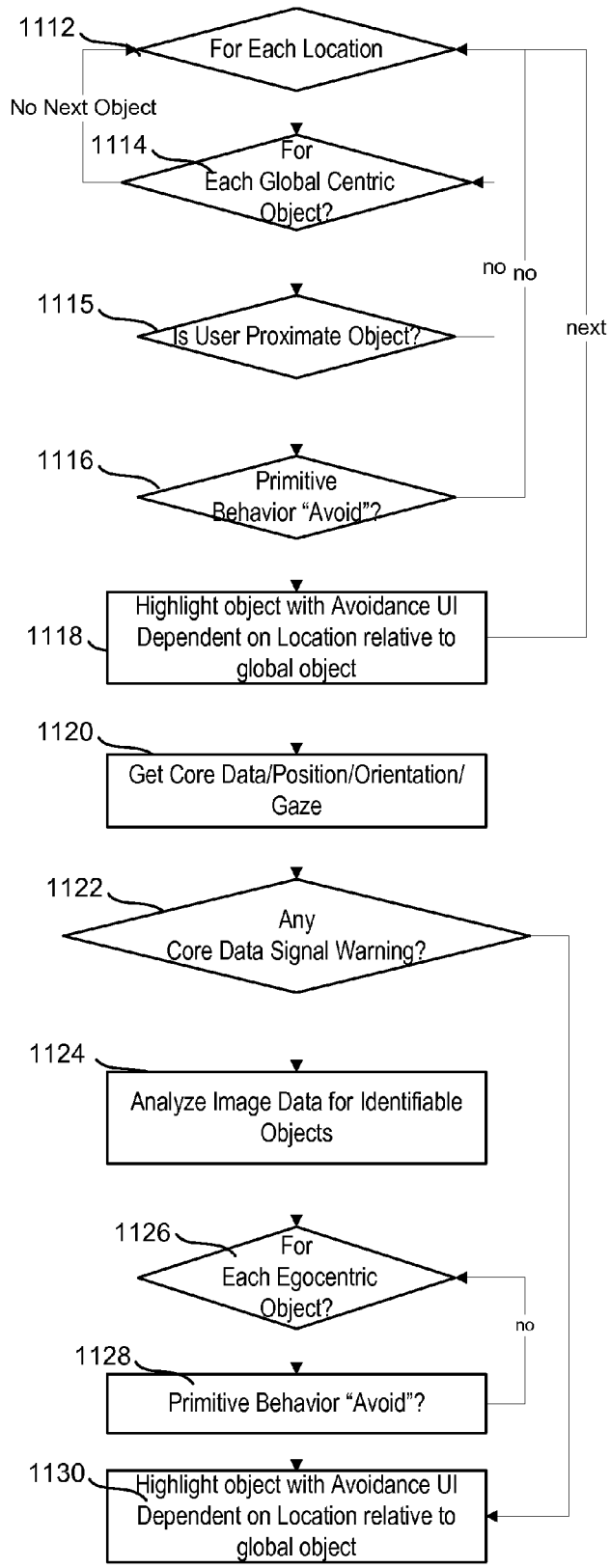
FIG. 10 is a flowchart illustrating a user warning application in a behavior based vision system.
Figure 11:
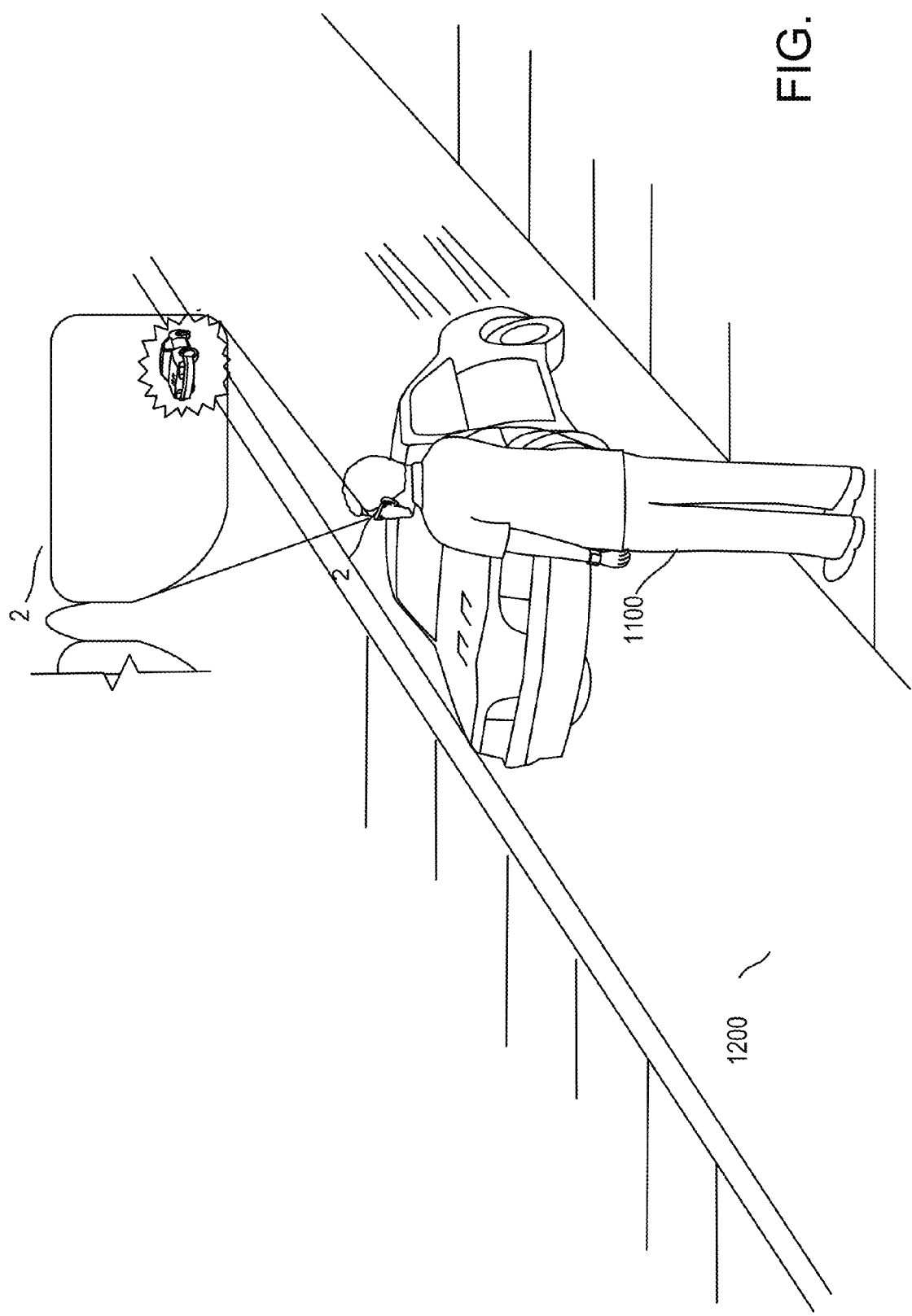
FIG. 11 is an illustration of a user interface provided by a user warning application in a behavior based vision system.

FIG. 10 is a flowchart representing the application processes of a user warning application. A user warning application may be an application designed to alert a user to hazardous situations involving objects near the user. One such hazardous situation is illustrated in FIG. 11. In FIG. 11, a user 1100 wearing a device 2 is about to cross the street 1200 in which an oncoming car 1210 is moving. Whether or not the user himself recognizes that the car is moving towards him, the device 2 can recognize a dangerous situation may exist and warn the user. Recognition can be based on the core data input—a notice of a change in input data—alone or in conjunction with the world zone knowledge that a street 1200 exists near the user.

Returning to FIG. 10, at step 1112 for each location of a wearer and at step 1114 for each global object near the location, a determination is made at step 1115 as to whether or not the wearer is proximate to the global object. Whether the wearer is proximate the object can be a determined by evaluating whether a wearer is within a specified distance from the object as calculated by the global positioning location identified for the wearer and the object. If the user is proximate to the global object, a determination is made whether one or more behavioral primitives indicate that the user should avoid the object exists. In FIG. 10, at step 1118, the behavioral primitive is illustrated as an "avoid" behavior, but any defined behavior may be used in the evaluation at 1116. If the behavior is present, then the object will be highlighted in accordance with an application user interface at step 1118. The location of the interface and the manner in which the warning is presented can vary greatly, but one example is presented in FIG. 11 where the car is highlighted in the view of the user 1100.

Although shown sequentially in FIG. 10, egocentric data may be simultaneously monitored at steps 1120-1130. At step 1120, core data as well as position, orientation and gaze data is acquired. Initially, at 1122, the method looks to any rapid changes in the core data which may justify providing the user with a warning in the UI. For example, if a rapid change in input depth data in a region of the wearer field of view occurs, the application may highlight this area to draw the user's attention to it. At 1124, image data is analyzed for identifiable objects. At 1126, for each object in egocentric space the user is proximate to, if a behavioral primitive for the object exists that the user should avoid it at 1128, the object may be highlighted at 1130 in the avoidance user interface. In the example shown in FIG. 11, the car would likely not be a global object, but would rather be identified by either step 1122 or step 1128 as the car approached the wearer. The street however, may likely be a global object, and would likely have a behavior associated with it which relates to "caution."

Figure 12:
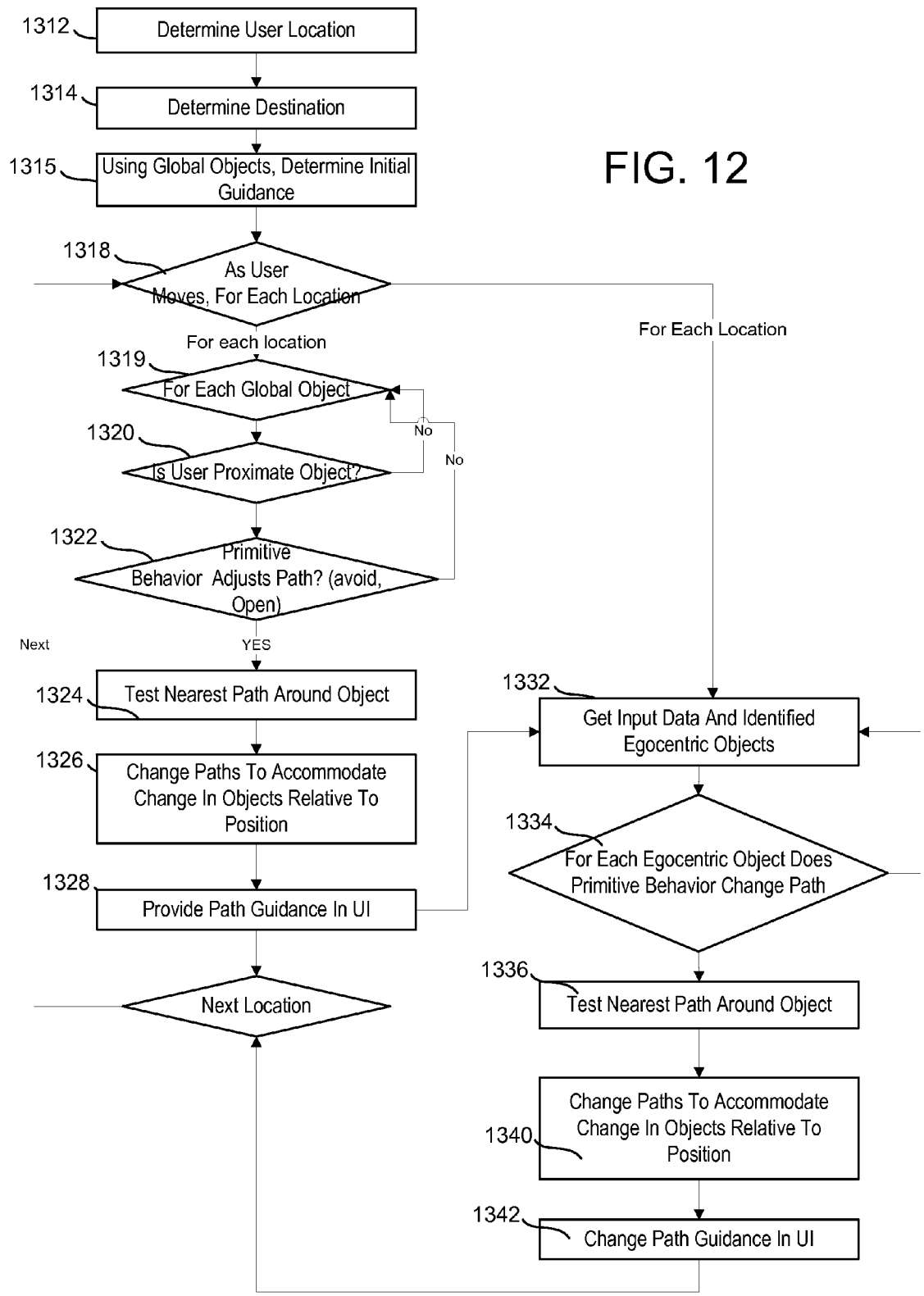
FIG. 12 is a flowchart illustrating a user navigation application in a behavior based vision system.

FIG. 12 illustrates an exemplary application processes for a navigation application. At 1312, the user location is determined and at 1314, the user destination is determined. At 1315 for each location, a determination is made as to all the global objects proximate to the location and an initial route guidance taking into account the behavioral primitives of the global objects is determined. For example, a street might have a primitive indicating it is "passable" while a building might have an "avoid" behavioral primitive.

At 1318, as a user moves, for each location of the wearer and at 1319, for each global object at the location, a determination is made as to whether a user is proximate to the global object at 1320 and at 1322, whether the primitive behavior associated with the global object adjusts the path of a user between the destination and the present location. If so, then the nearest path around each of the above objects is determined at 1324, and path around objects to be avoided are linked at 1326. Path guidance is then provided in the user interface at 1328. The method loops to the next location at 1330.

Similarly, for egocentric objects at 1332 (for each location at 1318), as the user moves, core input data and identified egocentric objects are obtained by the application at 1332. For each egocentric object identified, a determination is made at 1334 as to whether or not the primitive behavior associated with the object would require a change in the user's path. If so, the path is changed at 1336 and tested for navigation about the object. Once the new route is determined, the path is changed to accommodate a change in objects relative to the wearer position and a change in the path guidance provided in the user interface is provided at 1340.

Figure 13:
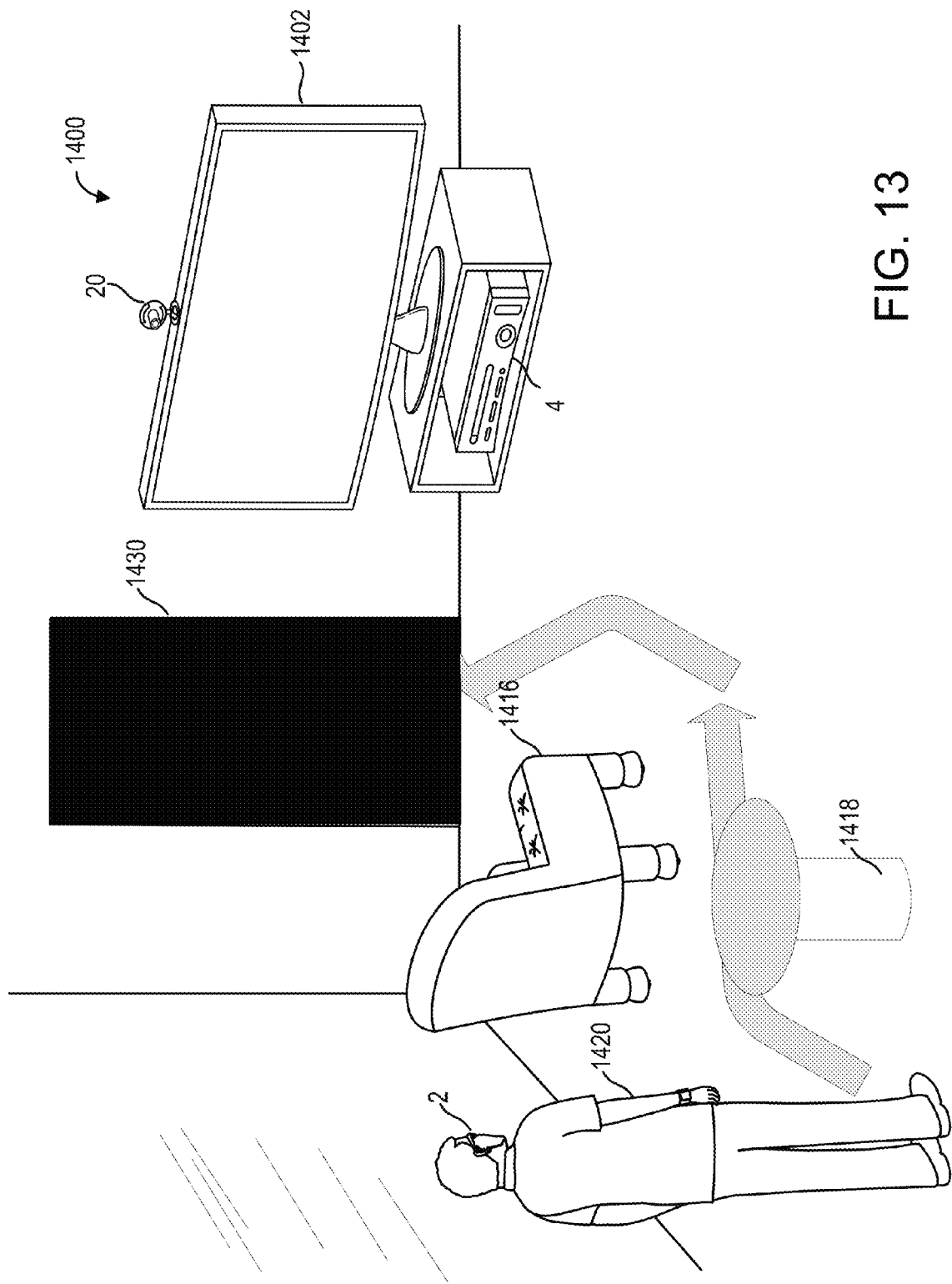
FIG. 13 is an illustration of a user interface provided by a user navigation application in a behavior based vision system.

FIG. 13 illustrates the user interface which may appear to a user as a result of the path guidance. In FIG. 13, a user 1420 is shown a path around a chair 1416 and table 1418 indicated by arrows 1300. The behavioral definitions of the chair 1416 and table 1418 indicate that the user should avoid them, while the behavioral definition of the door 1430 indicates that a user may pass through the door on his way to his next destination. While the chair table and door are likely egocentric objects, the same indications and behavioral primitives may be provided for global centric objects.

Figure 14:
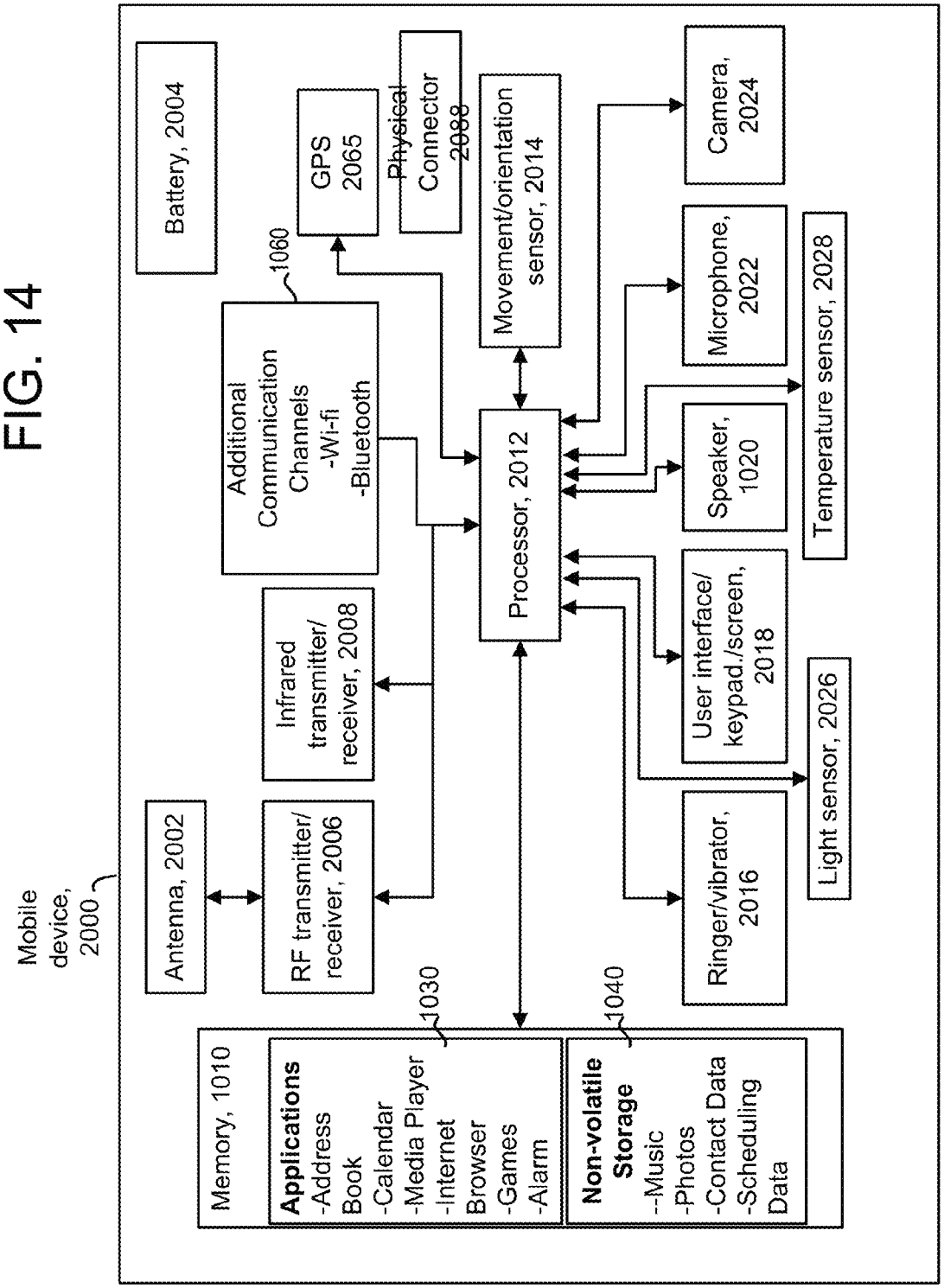
FIG. 14 is a block diagram of a first exemplary processing device.

FIG. 14 is a block diagram of an exemplary mobile device which may operate in embodiments of the technology described herein (e.g. processing unit 4). Exemplary electronic circuitry of a typical mobile phone is depicted. The device 2000 includes one or more microprocessors 2012, and memory 2010 (e.g., non-volatile memory such as ROM and volatile memory such as RAM) which stores processor-readable code which is executed by one or more processors of the control processor 2012 to implement the functionality described herein.

Mobile device 2000 may include, for example, processors 2012, memory 2050 including applications and non-volatile storage. The processor 2012 can implement communications, as well as any number of applications, including the interaction applications discussed herein. Memory 2050 can be any variety of memory storage media types, including non-volatile and volatile memory. A device operating system handles the different operations of the mobile device 2000 and may contain wearer interfaces for operations, such as placing and receiving phone calls, text messaging, checking voicemail, and the like. The applications 2030 can be any assortment of programs, such as a camera application for photos and/or videos, an address book, a calendar application, a media player, an Internet browser, games, other multimedia applications, an alarm application, other third party applications, the interaction application discussed herein, and the like. The non-volatile storage component 2040 in memory 2010 contains data such as web caches, music, photos, contact data, scheduling data, and other files.

The processor 2012 also communicates with RF transmit/receive circuitry 2006 which in turn is coupled to an antenna 2002, with an infrared transmitted/receiver 2008, with any additional communication channels 2060 like Wi-Fi or Bluetooth, and with a movement/orientation sensor 2014 such as an accelerometer. Accelerometers have been incorporated into mobile devices to enable such applications as intelligent wearer interfaces that let wearers input commands through gestures, indoor s functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 2012 further communicates with a ringer/vibrator 2016, a wearer interface keypad/screen, biometric sensor system 2018, a speaker 2020, a microphone 2022, a camera 2024, a light sensor 2026 and a temperature sensor 2028.

The processor 2012 controls transmission and reception of wireless signals. During a transmission mode, the processor 2012 provides a voice signal from microphone 2022, or other data signal, to the RF transmit/receive circuitry 2006. The transmit/receive circuitry 2006 transmits the signal to a remote station (e.g., a fixed station, operator, other cellular phones, etc.) for communication through the antenna 2002. The ringer/vibrator 2016 is used to signal an incoming call, text message, calendar reminder, alarm clock reminder, or other notification to the wearer. During a receiving mode, the transmit/receive circuitry 2006 receives a voice or other data signal from a remote station through the antenna 2002. A received voice signal is provided to the speaker 2020 while other received data signals are also processed appropriately.

Additionally, a physical connector 2088 can be used to connect the mobile device 2000 to an external power source, such as an AC adapter or powered docking station. The physical connector 2088 can also be used as a data connection to a computing device. The data connection allows for operations such as synchronizing mobile device data with the computing data on another device.

A GPS transceiver 2065 utilizing satellite-based radio navigation to relay the position of the wearer applications is enabled for such service.

Figure 15:
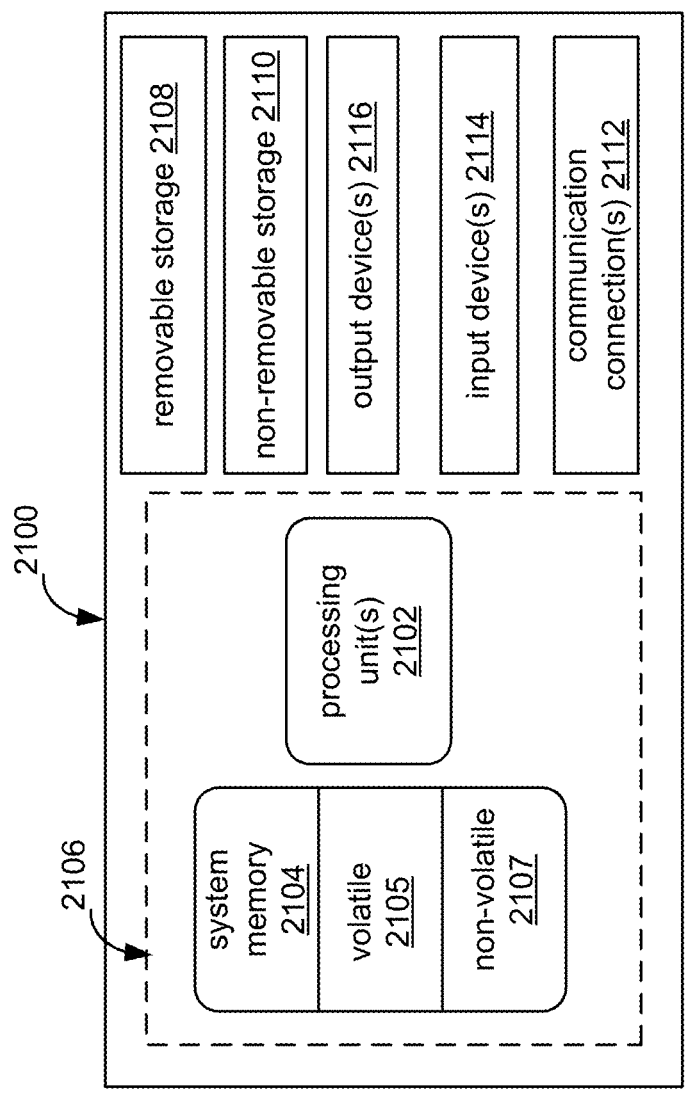
FIG. 15 is a block diagram of another exemplary processing device.

FIG. 15 is a block diagram of one embodiment of a computing system that can be used to implement a network accessible computing system or a companion processing module. With reference to FIG. 15, an exemplary system includes a computing device, such as computing device 2100. In its most basic configuration, computing device 2100 typically includes one or more processing units 2102 including one or more central processing units (CPU) and one or more graphics processing units (GPU). Computing device 2100 also includes memory 2104. Depending on the exact configuration and type of computing device, memory 2104 may include volatile memory 2105 (such as RAM), non-volatile memory 2107 (such as ROM, flash memory, etc.) or some combination of the two. This most basic configuration is illustrated in FIG. 15 by dashed line 2106. Additionally, device 2100 may also have additional features/functionality. For example, device 2100 may also include additional storage (removable and/or non-removable) including, but not limited to, magnetic or optical disks or tape. Such additional storage is illustrated by removable storage 2108 and non-removable storage 2110.

Device 2100 may also contain communications connection(s) 2112 such as one or more network interfaces and transceivers that allow the device to communicate with other devices. Device 2100 may also have input device(s) 2114 such as keyboard, mouse, pen, voice input device, touch input device, etc. Output device(s) 2116 such as a display, speakers, printer, etc. may also be included. All these devices are well known in the art and are not discussed at length here.

The example computer systems illustrated in the figures include examples of computer readable storage devices. A computer readable storage device is also a processor readable storage device. Such devices may include volatile and non-volatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A see through display apparatus, comprising:
   a see-through, head mounted display;
   a plurality of sensors cooperating with the display to detect at least visual data in a field of view of the apparatus; and
   one or more processors in communication with the display and the sensors, the one or more processors automatically:
   establish a plurality of behavioral zones representing a scene mapped to a physical environment that is relative to the apparatus such that each of the plurality of behavioral zones are segmented into different types of information having different defined behaviors that relate to at least one real object within a corresponding zone, wherein a first of the behavioral zones surrounds a wearer of the see-through head mounted display and is proximate to the wearer compared to a second of the behavioral zones, and the second of the behavioral zones encompasses the first behavioral zone and includes objects registered to a global space;
   determine the at least one real object proximate to the apparatus using one of geographic position data and data from the sensors, the at least one real object associated with one of the plurality of behavioral zones;
   assign one or more of the behaviors with the at least one real object based on the association; and
   provide a data definition, for the at least one real object, comprising the one or more behaviors to a feedback application for the apparatus.

2. The apparatus of claim 1 wherein the one or more processors establish at least a global behavioral zone and an egocentric behavioral zone.

3. The apparatus of claim 2 wherein the one or more processors determine the egocentric behavioral zone based on input data from the plurality of sensors.

4. The apparatus of claim 2 wherein the global behavioral zone includes real object data mapped to geographical position data for real objects.

5. The apparatus of claim 1 wherein each behavioral zone includes one or more unique behaviors associated with the behavioral zone.

6. The apparatus of claim 1 wherein the one or more processors receive feedback generated by the application relative to real object data for display on the apparatus.

7. A computer storage device including instructions to perform a method of providing a vision system, the instructions when executed by a processor comprising:
   identifying a plurality of real objects in a global behavioral zone using geographic position data and in an egocentric behavioral zone using sensor data, such that the global behavioral zone corresponds to a physical environment and the egocentric behavioral zone is a sub-zone of the global behavioral zone, the global behavioral zone and egocentric behavioral zones are segmented into different types of information having different defined behaviors that relate to at least one real object within a corresponding zone, the defined behaviors constrained within one of the global and egocentric behavioral zones and interaction with a real object such that the egocentric behavioral zone surrounds a wearer wearing a see-through head mounted display and the global behavioral zone encompasses the egocentric behavioral zone;
   assigning one or more of a first plurality of behaviors and a second plurality of behaviors to each real object identified in the global behavior zone and the egocentric behavioral zone, respectively, the behavior comprising a behavioral primitive rule for the wearer of the see through head mounted display and being dependent on an expected user behavior relative to the object in each behavioral zone; and
   for at least the real object proximate to a location, providing a data definition, for the at least one real object, comprising the one or more behaviors to a feedback application for the system.

8. The computer storage device of claim 7 wherein the behaviors comprise one of danger, avoidance, touch, and look.

9. The computer storage device of claim 7 further including creating a data definition for each of the plurality of real objects, the data definition including data identifying the real object to the device.

10. The computer storage device of claim 9 wherein the data identifying the real object to the device is geographical position data for real objects.

11. The computer storage device of claim 10 wherein data identifying the real object to the device is input data from a plurality of sensors on the device.

12. The computer storage device of claim 11 the egocentric zone includes interactive behaviors with real objects.

13. The computer storage device of claim 12 further including providing feedback generated by the application relative to one or more of the real objects for rendering on the display.

14. A computer implemented method for a see through display apparatus comprising:
   receiving visual sensor data from a plurality of sensors cooperating with the display;
   identifying a plurality of real objects in a global behavioral zone using geographic position data, and in an egocentric behavioral zone using the sensor data, such that the global behavioral zone and the egocentric behavioral zone are defined by a proximate and physical environment and are segmented into different types of information having different defined behaviors that relate to at least one real object within a corresponding zone, the defined behaviors constrained within one of the global and egocentric behavioral zones and interaction with a real object such that the egocentric behavioral zone surrounds a wearer wearing a see-through head mounted display and the global behavioral zone encompasses the egocentric behavioral zone;

assigning one or more of a first plurality of behaviors for the global behavioral zone to each real object identified in the global behavioral zone;

assigning one or more of a second plurality of behaviors for the egocentric behavioral zone to each real object determined to be in the egocentric behavioral zone; and providing a data definition, for the at least one real object, comprising the behaviors to a feedback application.

15. The method of claim 14 further including creating a data definition for each of the plurality of real objects, the data definition including data identifying the real object to the device.

16. The method of claim 1 wherein display of a path of the wearer is adjusted between a destination and a current location in response to a determination that the wearer is proximate to the at least one real object.

17. The method of claim 16 wherein data identifying the real object to the device is input data from a plurality of sensors providing imaging data to the processors.

18. The method of claim 5 wherein the second plurality of behaviors includes interactive behaviors with real objects.

19. The apparatus of claim 1 wherein each behavior comprises a behavioral primitive rule for the at least one real object relative to the wearer of the apparatus, and the primitive rule includes a warning to provide to the wearer of the apparatus when the wearer is within a specified distance of the real object.

* * * * *